United States Patent
Pakzad et al.

(10) Patent No.: US 9,014,716 B2
(45) Date of Patent: Apr. 21, 2015

(54) TECHNIQUES FOR PROCESSING PERCEIVED ROUTABILITY CONSTRAINTS THAT MAY OR MAY NOT AFFECT MOVEMENT OF A MOBILE DEVICE WITHIN AN INDOOR ENVIRONMENT

(75) Inventors: Payam Pakzad, Mountain View, CA (US); Behrooz Khorashadi, Mountain View, CA (US); Hui Chao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 13/568,026

(22) Filed: Aug. 6, 2012

(65) Prior Publication Data

US 2013/0267178 A1    Oct. 10, 2013

Related U.S. Application Data

(60) Provisional application No. 61/622,334, filed on Apr. 10, 2012.

(51) Int. Cl.
*H04W 24/00* (2009.01)
*G01C 21/34* (2006.01)
*H04W 4/02* (2009.01)
*H04W 4/04* (2009.01)

(52) U.S. Cl.
CPC ............ *H04W 4/043* (2013.01); *H04W 4/028* (2013.01)

(58) Field of Classification Search
USPC ............... 455/456.1, 566; 342/450, 451, 452; 701/431, 434, 400, 409, 433
See application file for complete search history.

(56) References Cited

U.S. PATENT DOCUMENTS

| | | | |
|---|---|---|---|
| 7,221,928 B2 | 5/2007 | Laird et al. | |
| 8,000,892 B2 | 8/2011 | Banerjee | |
| 8,504,288 B2 * | 8/2013 | Kadous et al. | 701/433 |
| 8,635,023 B2 * | 1/2014 | Friedler et al. | 701/495 |
| 2006/0293839 A1 * | 12/2006 | Stankiewicz et al. | 701/200 |
| 2009/0043504 A1 | 2/2009 | Bandyopadhyay et al. | |
| 2009/0054076 A1 | 2/2009 | Evennou et al. | |
| 2011/0081918 A1 | 4/2011 | Burdo et al. | |
| 2011/0082638 A1 | 4/2011 | Khorashadi et al. | |
| 2011/0177809 A1 | 7/2011 | Pakzad et al. | |
| 2011/0196647 A1 | 8/2011 | Peraelae et al. | |
| 2012/0044265 A1 | 2/2012 | Khorashadi et al. | |
| 2012/0143495 A1 * | 6/2012 | Dantu | 701/428 |
| 2013/0257657 A1 * | 10/2013 | Garin et al. | 342/451 |
| 2013/0311084 A1 * | 11/2013 | Lundquist et al. | 701/430 |

OTHER PUBLICATIONS

International Search Report and Written Opinion—PCT/US2013/035805—ISA/EPO—Dec. 5, 2013.

* cited by examiner

*Primary Examiner* — Nguyen Vo

(74) *Attorney, Agent, or Firm* — Berkeley Law & Technology Group, LLP

(57) ABSTRACT

Techniques are provided which may be implemented using various methods, apparatuses and/or articles of manufacture to provide or otherwise support mobile device positioning. The mobile device positioning may be based, at least in part, on one or more perceived routability constraints that may or may not affect actual movement of a mobile device within an indoor environment.

40 Claims, 8 Drawing Sheets

TECHNIQUES FOR PROCESSING PERCEIVED ROUTABILITY CONSTRAINTS THAT MAY OR MAY NOT AFFECT MOVEMENT OF A MOBILE DEVICE WITHIN AN INDOOR ENVIRONMENT

CLAIM OF PRIORITY UNDER 35 U.S.C. §119

This application claims priority under 35 USC 119 to U.S. Provisional Application Ser. No. 61/622,334, filed Apr. 10, 2012, and entitled, "TECHNIQUES FOR PROCESSING PERCEIVED ROUTABILITY CONSTRAINTS THAT MAY OR MAY NOT AFFECT MOVEMENT OF A MOBILE DEVICE WITHIN AN INDOOR ENVIRONMENT", which is assigned to the assignee here of, and which is incorporated herein by reference.

BACKGROUND

1. Field

The subject matter disclosed herein relates to electronic devices, and more particularly to methods, apparatuses and articles of manufacture for use in one or more computing platforms to provide or otherwise support mobile device positioning based, at least in part, on one or more perceived routability constraints that may or may not affect movement of a mobile device within an indoor environment.

2. Information

Mobile devices, such as mobile phones, notebook, computers, etc., typically have the ability to estimate location and/or position with a high degree of precision using any one of several technologies such as, for example, satellite positioning systems (e.g., GPS and the like), advanced forward-link trilateration (AFLT), just to name a few examples of signal-based positioning systems and/or corresponding signal signals. Using high precision location information, applications for a mobile device may provide a user with many different services such as, for example, vehicle/pedestrian navigation, location-based searching, just to name a couple of examples. Here, high precision signal-based location information (e.g., received from GPS and/or other signal-based positioning systems) may be processed according to a global coordinate system (e.g., latitude and longitude or earth-centered xyz coordinates). While such use of signal-based location information referenced to a global coordinate system may be useful in providing some services (e.g., outdoor vehicle navigation), such signal-based location information referenced to a global coordinate system may be impractical for other types of services such as indoor pedestrian navigation.

In certain indoor environments, such as office buildings, shopping malls, airports, stadiums, etc., certain example signal-based positioning techniques may make use of various terrestrial-based wireless signal transmitting devices, e.g., wireless network access points, cellular network base stations, special-purpose beacon transmitters, etc., that transmit wireless signals which may be received by the mobile device and used for positioning purposes. For example, a mobile device may receive a signal-based positioning signal from a transmitter and based thereon determine a range between the transmitter and receiver. Hence, for example, positioning may be provided based on trilateration and/or other known signal-based positioning techniques.

SUMMARY

In accordance with certain aspects, a method may be provided for supporting mobile device positioning. The method may comprise, with at least one computing platform: receiving an electronic map for an indoor environment, wherein at least a portion of the electronic map comprises displayable image data; identifying at least one perceived routability constraint based, at least in part, on the displayable image data; setting a measure of confidence for the at least one perceived routability constraint based, at least in part, on the displayable image data; and if the computing platform is part of a mobile device, estimating a trajectory of the mobile device within the indoor environment based, at least in part, on the measure of confidence, otherwise if the computing platform as part of a computing device external to the mobile device, transmitting at least the measure of confidence to the mobile device, e.g., for use in estimating the trajectory of the mobile device within the indoor environment.

In accordance with yet certain other aspects, an apparatus may be provided for use in a mobile device, wherein the apparatus comprises: means for receiving an electronic map for an indoor environment, wherein at least a portion of the electronic map comprises displayable image data; means for identifying at least one perceived routability constraint based, at least in part, on the displayable image data; means for setting a measure of confidence for the at least one perceived routability constraint based, at least in part, on the displayable image data; means for estimating a trajectory of the mobile device within the indoor environment based, at least in part, on the measure of confidence; and means for presenting estimated positioning information to the user of the mobile device, the positioning information being based, at least in part, on the trajectory of the mobile device within the indoor environment.

In accordance with certain further aspects, an apparatus may be provided for use in a computing device is external to the mobile device to support mobile device positioning. Here, for example, such an apparatus may comprise: means for receiving an electronic map for an indoor environment, wherein at least a portion of the electronic map comprises displayable image data; means for identifying at least one perceived routability constraint based, at least in part, on the displayable image data; means for setting a measure of confidence for the at least one perceived routability constraint based, at least in part, on the displayable image data; and means for transmitting at least the measure of confidence to the mobile device for use in estimating the trajectory of the mobile device within the indoor environment.

In accordance with still certain other aspects, a mobile device may be provided which comprises: memory; an output unit; and one or more processing units to: access an electronic map for an indoor environment via the memory, wherein at least a portion of the electronic map comprises displayable image data; identify at least one perceived routability constraint based, at least in part, on the displayable image data; set a measure of confidence for the at least one perceived routability constraint based, at least in part, on the displayable image data; estimate a trajectory of the mobile device within the indoor environment based, at least in part, on the measure of confidence; and initiate presentation of estimated positioning information to the user of the mobile device via the output unit, the positioning information being based, at least in part, on the trajectory of the mobile device within the indoor environment.

In accordance with still other aspects, a computing device may be provided for use in supporting mobile device positioning. Here, for example, such a computing device may comprise: memory; a communication interface; and one or more processing units to: access an electronic map for an indoor environment via the memory, wherein at least a portion of the electronic map comprises displayable image data; identify at least one perceived routability constraint based, at least in part, on the displayable image data; set a measure of confidence for the at least one perceived routability constraint based, at least in part, on the displayable image data; and initiate transmission, via the communication interface, of at least the measure of confidence to the mobile device for use in estimating the trajectory of the mobile device within the indoor environment.

In accordance with still other aspects, an article of manufacture may be provided for use in a computing device to support mobile device positioning. Here, for example, such an article of manufacture may comprise a non-transitory computer readable medium having computer implementable instructions stored therein that are executable by one or more processing units of a computing platform of a mobile device to: receive an electronic map for an indoor environment, wherein at least a portion of the electronic map comprises displayable image data; identify at least one perceived routability constraint based, at least in part, on the displayable image data; set a measure of confidence for the at least one perceived routability constraint based, at least in part, on the displayable image data; estimate a trajectory of the mobile device within the indoor environment based, at least in part, on the measure of confidence; and initiate presentation of estimated positioning information to the user of the mobile device, the positioning information being based, at least in part, on the trajectory of the mobile device within the indoor environment.

In accordance with still further aspects, an article of manufacture may be provided for use in a computing platform that is external to a mobile device to support mobile device positioning. Here, for example such an article of manufacture may comprise a non-transitory computer readable medium having computer implementable instructions stored therein that are executable by one or more processing units of the computing platform to: receive an electronic map for an indoor environment, wherein at least a portion of the electronic map comprises displayable image data; identify at least one perceived routability constraint based, at least in part, on the displayable image data; set a measure of confidence for the at least one perceived routability constraint based, at least in part, on the displayable image data; and initiate transmission of at least the measure of confidence to the mobile device for use in estimating the trajectory of the mobile device within the indoor environment.

According to another aspect, a method may be provided for a mobile device, wherein the method comprises: receiving a measure of confidence for at least one perceived routability constraint identified based, at least in part, on displayable image data of an electronic map for an indoor environment; estimating a trajectory of the mobile device within the indoor environment based, at least in part, on the measure of confidence for the at least one perceived routability constraint; and presenting estimated positioning information to the user of the mobile device, the positioning information being based, at least in part, on the trajectory of the mobile device within the indoor environment.

According to a further aspect, an apparatus to provide mobile device positioning may comprise: means for receiving a measure of confidence for at least one perceived routability constraint identified based, at least in part, on displayable image data of an electronic map for an indoor environment; means for estimating a trajectory of the mobile device within the indoor environment based, at least in part, on the measure of confidence for the at least one perceived routability constraint; and means for presenting estimated positioning information to the user of the mobile device, the positioning information being based, at least in part, on the trajectory of the mobile device within the indoor environment.

According to certain further aspects, a mobile device may be provided having a positioning capability, wherein the mobile device comprises: memory; an output unit; and one or more processing units to: receive, via the memory, a measure of confidence for at least one perceived routability constraint identified based, at least in part, on displayable image data of an electronic map for an indoor environment; estimate a trajectory of the mobile device within the indoor environment based, at least in part, on the measure of confidence for the at least one perceived routability constraint; and initiate presentation of estimated positioning information to the user of the mobile device via the output unit, the positioning information being based, at least in part, on the trajectory of the mobile device within the indoor environment.

According to yet another aspect, in article of manufacture may be provided for use in a mobile device to provide for mobile device positioning. Here, for example, such an article of manufacture may comprise a non-transitory computer readable medium having computer implementable instructions stored therein that are executable by one or more processing units of a computing platform to: receive a measure of confidence for at least one perceived routability constraint identified based, at least in part, on displayable image data of an electronic map for an indoor environment; estimate a trajectory of the mobile device within the indoor environment based, at least in part, on the measure of confidence for the at least one perceived routability constraint; and initiate presentation of estimated positioning information to the user of the mobile device, the positioning information being based, at least in part, on the trajectory of the mobile device within the indoor environment.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
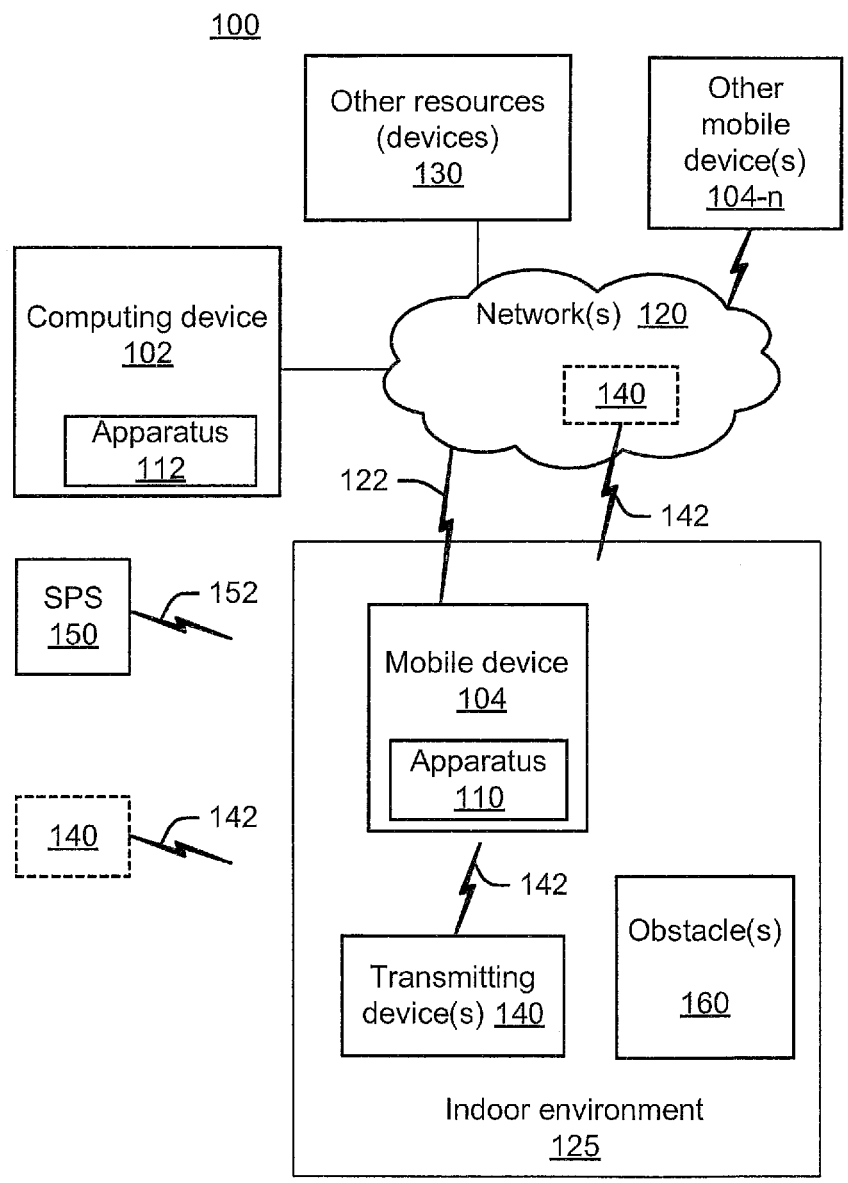
FIG. 1 is a schematic block diagram illustrating an example environment that includes a computing device and a mobile device, one or more of which may provide or otherwise support mobile device positioning based, at least in part, on one or more perceived routability constraints that may or may not affect actual movement of a mobile device within an indoor environment, in accordance with an example implementation.

As illustrated by the examples herein, various methods, apparatuses and articles of manufacture may be implemented for use in one or more computing platforms to provide or otherwise support mobile device positioning based, at least in part, on one or more perceived routability constraints that may or may not affect actual movement of a mobile device (e.g., while being carried by person) within an indoor environment.

In accordance with certain example implementations, one or more computing platforms in one or more electronic devices may be provided to receive an electronic map for an indoor environment, wherein at least a portion of the electronic map comprises displayable image data. An electronic map may comprise various forms or formats of data files having displayable image data. An electronic map may, for example, comprise displayable image data associated with one or more drawing file formats, image file formats, and/or the like or some combination thereof.

For example, in certain implementations, displayable image data may comprise vector-based image data, raster-based image data, and/or the like or some combination thereof. As such, in certain example implementations displayable image data may comprise a Computer-Aided Design (CAD), Computer Graphics Metafile (CGM), Scalable Vector Graphics (SVG), and/or other like drawings which may use, at least in part, vector-based image data. For example in certain implementations displayable image data may comprise one or more file formats, such as, e.g., Joint Photographic Experts Group (JPEG), Exchangeable Image File Format (Exif), Tagged Image File Format (TIFF), Portable Network Graphics (PNG), Graphics Interchange Format (GIF), and/or other like image files which may use, at least in part, raster-based image data. For example in certain implementations displayable image data may comprise one or more file formats which may use, at least in part, one or more of vector-based image data and/or raster-based image data, such as, e.g., PostScript, Encapsulated PostScript (EPS), Portable Document Format (PDF), a QuickDraw file (PICT), and/or other like forms of image files. In certain further implementations, displayable image data may comprise three-dimensional imaging and/or other like stereo formatted files.

As described in greater detail herein, there may be some displayable image data within an electronic map that may have been intentionally added and/or unintentionally added and/or altered in some manner at some point in processing (e.g., generating, copying, encoding, storing, etc.) the electronic map. Consequently, there may be one or more perceived routability constraints within the displayable image data that may or may not affect actual movement of the mobile device within the indoor environment. A perceived routability constraint, in a general sense, may comprise an actual physical object that may be present in the actual indoor environment and which is intentionally represented in some manner by the data encoded within a corresponding electronic map. Additionally, in certain instances, such an electronic map may also include other data that may be mistaken as representing an actual physical object within the indoor environment, when in fact no such actual object actually exists within the indoor environment. It may be useful to be able to determine whether or not such data encoded within an electronic map represents one or more actual physical objects that may affect navigation within the indoor environment. By way of an initial example, in certain instances, various annotating text (e.g., room designations, descriptors, measurements, notes, etc.) and/or graphics (e.g., icons, symbols, color coding, etc.) may be added to displayable image data. Since, such annotating text and/or graphics would likely not be present in the actual indoor environment, it may be beneficial to identify and/or otherwise handle such perceived routability constraints in a manner that provides some level of flexibility with regard to estimating a trajectory of the mobile device within the indoor environment.

Similarly, it may be beneficial to identify and/or otherwise handle perceived routability constraints that may relate to displayable image data that was not intended to represent actual physical obstacles and/or was not intended to be part of an electronic map in the first place. For example, various perceived routability constraints may actually relate to simple processing induced alterations, annotations, noise, errors, and/or the like or some combination thereof. For example, displayable image data may be corrupted and/or otherwise altered in some manner in copying or transferring it from one format to another, or possibly changing its size or scale or resolution, or possibly affecting its color or contrast, or in expanding/reducing the size of one or more corresponding data file(s) size(s). For example, vector-based image data provided in an electronic map may or may not properly represent the scale of certain obstacles within an indoor environment; e.g., a line in certain vector-based image data may represent to scale a length of a wall or other like object that it represents, but not necessarily represent to scale the width of such a wall or other like object. For example, raster-based image data provided in electronic map may or may not properly represent a scale of certain obstacles within an indoor environment; e.g., an object transition in certain raster-based image data may be dithered and/or otherwise encoded in some manner that a point of actual demarcation between adjacent objects and/or other like distinguishable regions may not be distinguished with enough specificity to be considered accurate under certain conditions. Here, for example, certain raster-based image data may at certain resolutions present somewhat fuzzy lines or regions due to the encoding of pixels (e.g., pixel values, etc.) for use with an array of pixels in a display device, or possibly in a printing device.

In accordance with certain example implementations, at least one perceived routability constraint may be identified and a measure of confidence for such perceived routability constraint may be set based, at least in part, on the displayable image data. Such a measure of confidence may, for example, be made available for use in estimating a trajectory of a mobile device within the indoor environment.

By way of an initial example, a perceived routability constraint may comprise all or part of a line (e.g., which may be straight, curved, solid, dashed, shaded, patterned, etc.) or possibly an object transition (e.g., which may be identifiable as an edge of some object or obstacle, a demarcation between two adjacent objects and/or obstacles, a demarcation between a physical obstacle that may hinder navigation and an adjacent region within an indoor environment that may permit navigation there through, etc.).

With this in mind, in certain example implementations, at least a portion of the displayable image data may represent (e.g., via vector-based image data, raster-based image data, etc.) a plurality of pixels (e.g., using pixel values, etc.) corresponding to at least a portion of a line or an object transition, and all or part of the plurality of pixels may be identified as one or more perceived routability constraints based, at least in part, on one or more threshold values, thresholding tests, and/or the like.

For example, a threshold value may be based, at least in part, on a minimum pixilated line measurement (e.g., length measurement). Thus, for example, if a plurality of adjacent pixels and/or other nearby pixels having similar pixel values exceeds a minimum pixilated line measurement then all or part the plurality of adjacent pixels may be identified as one or more perceived routability constraints. Here, for example, if a minimum pixilated line measurement is equal to seventy (70) pixels then all or part of a line or other grouping of seventy-one (71) or more pixels may be identified as one or more perceived routability constraints. It should be understood that in certain implementations, various threshold values relating to lengths or widths, or other like identifiable groupings of pixels obtained from displayable image data may indicate such thresholds based on a certain number of pixels (e.g. as illustrated preceding example), and/or some other applicable measurement techniques (e.g., millimeters, centimeters, inches, dots, some nominal grid unit, etc.).

In another example, a threshold value may be based, at least in part, on a minimum pixilated object transition measurement (e.g., line width or region's depth measurement). Thus, for example, if a plurality of adjacent pixels and/or some other like grouping of pixels having similar pixel values exceeds a minimum pixilated object transition measurement then all or part of the plurality of pixels may be identified as one or more perceived routability constraints. Here, for example, if a maximum pixilated noise measurement is equal to forty (40) then all or part of a grouping of forty-one (41) or more adjacent and/or otherwise grouped pixels may be identified as one or more perceived routability constraints.

In yet another example, a threshold value may be based, at least in part, on a maximum pixilated noise measurement (e.g., length and/or width measurement, or some other measurable grouping of pixels). Thus, for example, if a single pixel and/or some number of a plurality of adjacent or neighboring pixels having similar pixel values exceeds the maximum pixilated noise measurement then such a single pixel may be identified as a perceived routability constraint, or all or part of the plurality of pixels may be identified as one or more perceived routability constraints. Here, for example, if a maximum pixilated noise measurement is equal to fifteen (15) then all or part a grouping of sixteen or more adjacent or neighboring pixels may be identified as one or more perceived routability constraints.

As illustrated in the example above, a maximum pixilated noise measurement, as its name implies, may be implemented to serve as a filter to remove certain isolated, likely spurious, items that may appear within displayable image data under certain conditions. With this in mind, in accordance with certain implementations it may be beneficial to implement other image recognition and/or filtering techniques which might also help identify portions of the displayable image data as representing a perceived routability constraint or not. Thus, for example, various image filtering techniques may be used to remove or otherwise affect or identify displayable image data relating to dust or other noise or speckles that may appear in certain image data, e.g. as result of scanning and/or other like processing image data. In another example, various edge detection and/or contrast techniques may be implemented to further refine certain image data and/or eliminate certain image data. In still another example, it may be beneficial to use various image straightening techniques.

In certain example implementations it may be beneficial to perform some form of Optical Character Recognition (OCR) and/or the like to identify certain added annotations which may then not be necessarily identified as a perceived routability constraint, e.g., clearly an added room name, such as "Conference Room", within a portion of the displayable image data for electronic map of an office design is not intended to represent some physical obstacle within such a conference room. In another example, color or shape analysis may be performed to identify certain annotations, etc.

In yet another example, in certain implementations it may be beneficial to perform some form of scale or normalization with regard to all or part of the displayable image data. For example, in certain instances a scale may be corrected by identifying certain scale information, and/or possibly identifying certain represented features within the displayable image data that may be equated to a particular scale or size. Here for example, in certain implementations, a doorway or a stair step, and/or some other physical feature may be associated with certain building codes or other like standards, and hence identifying such features within an electronic map may allow for certain changes to one or more dimensional scales, which may improve the usefulness of the electronic map and/or certain example techniques provided herein.

A measure of confidence may be associated with a perceived routability constraint, e.g., based at least in part, on a number of adjacent pixels having similar pixel values (e.g., pixel values that fall within a particular threshold range of pixel values), a comparison of the similar pixel values to pixel values of other surrounding and/or adjacent pixels, and/or the like or some combination thereof. It should be recognized in the examples above that various pixel values may be considered, e.g., including values identifying color or hue, intensity, and/or the like or some combination thereof. In certain implementations, for example, pixel values for some grouping of pixels may be considered similar if they fall within some range of pixel values. In certain implementations, for example, pixel values may be considered similar if they may be differentiated in some manner from various other adjacent or nearby/neighboring pixel values.

It should be understood that the examples presented herein relate to just a few implementations that may be used to detect groupings of pixels that relate to lines and/or object transitions within displayable image data, and that other types of object detection, edge detection, transition detection, etc., may be implemented in certain other example implementations. Likewise, in certain implementations, other tests that detect or identify regions without objects, regions without edges, regions without transitions, etc., may be implemented in like fashion to help identify one or more perceived routability constraints based, at least in part, on the displayable image data.

It should be understood that in accordance with certain implementations an array of pixels may comprise a plurality of pixels which may be arranged according to a particular pattern, more than one pattern, or possibly according to some more random arrangement, e.g., depending upon a particular display device upon which certain pixel values may be rendered or otherwise processed in some manner to presented image that may be viewed by a person or possibly a machine. Thus, in accordance with certain implementations, an array of pixels may comprise a plurality of pixels arranged in rows and columns. Hence, in such implementations adjacent pixels may share a common row and/or column, and/or may be arranged along some diagonal provided by applicable row and column assignments. In accordance with certain other implementations, two pixels may be considered adjacent to one another if the two pixels share at least some portion of a common border corner or facet, e.g. depending upon their various shapes. In certain instances, two pixels may be considered adjacent to one another if there are no other pixels between them. In accordance with certain implementations, accommodation may be made in certain implementations of the techniques provided herein to allow for different types of pixels arranged within an array of pixels. Thus for example, two pixels of the same type may be adjacent to even though one or more other types of pixels may be arranged there between. Further, in certain instances, accommodation may be made in certain implementations of the techniques provided herein to allow for a threshold number of pixels to be ignored or skipped when considering whether two or more pixels may be adjacent to one another. Thus, for example, accommodation may be made for a certain number of pixels that may appear within some line or pattern with dissimilar pixel values as a result of noise and/or other like distorting processes or information. In other example implementations, accommodation may be made for certain number of pixels that may be inactive or otherwise experience certain operating conditions when considering whether two or more pixels may be adjacent to one another. Hence, for example, it may be acceptable in certain implementations for a thresholding and/or other like test for a particular line, object transition, noise grouping, etc., to permit, ignore, or otherwise skip certain pixel within displayable image data. Accordingly, in certain implementations, certain tests may allow for a range of acceptable conditions that may satisfy such tests.

Further, it should be kept in mind that while some examples presented herein show certain arrangements of pixel arrays and/or shapes of individual pixels, as with the other examples presented herein claimed subject matter is not intended to be limited to such examples.

In certain example implementations additional information that may be provided in metadata and/or other data files associated with displayable image data, e.g. as part of an electronic map, may be used to further help identify or alternatively identify one or more perceived routability constraints and/or regions without perceived routability constraints in accordance with certain further example implementations. Thus for example, certain CAD and/or other like drawings may include metadata identifying certain objects within an electronic map by type, and in certain instances some of such identifiable types of objects may or may not be identified as presenting a perceived routability constraint, and/or a measure of confidence for such perceived routability constraint may be based on such additional information that may be available.

In certain instances, metadata may indicate that an object in an electronic map relates to a key or other visual identifier (e.g., annotating information, etc.) rather than an actual physical object that may affect movement of a mobile device within an indoor environment. Thus, such an object may be not identified as a perceived routability constraint, and/or if identified as a perceived routability constraint its associated measure of confidence may be substantially low if not non-existent due to the additional information that may be obtained and understood. Conversely, for example, metadata may indicate that a particular object and electronic map relates to an installed office cubicle divider and/or some other like object that may or may not affect movement of a mobile device within an indoor environment. Thus, such an object may be identified as a perceived routability constraint and its associated measure of confidence may be based on such additional information that may be obtained and understood.

With these examples and others in mind, in accordance with certain example implementations, a perceived routability constraint may correspond to at least a portion of a line or an object transition identified within the displayable image data. Since a perceived routability constraint may or may not represent an actual physical obstacle within an indoor environment, a measure of confidence may be assigned to or otherwise associated with the perceived routability constraint. For example, a measure of confidence for a perceived routability constraint may be set using some form of a weight value that may be indicative of an estimated likelihood that a perceived routability constraint may or may not represent actual physical obstacle to navigation.

Accordingly, a weight value may be assigned to or otherwise associated with all or part of a line, an object transition and/or the like grouping of pixels that may be identified within the displayable image data and identify as one or more perceived routability constraints. Thus, for example, an appropriate weight value may be associated with one or more pixel values and/or other like information that may be provided within the displayable image data. Such a weight value may, for example, identify and/or otherwise relate to an estimated likelihood that the perceived routability constraint represents at least part of an actual obstacle within the indoor environment capable of affecting movement of the mobile device within the indoor environment. Thus, for example, a weight value may take the form of a numerical value, e.g., an integer between 0 and 10, a number between 0.00 and 1.00, a percentage and/or the like or some combination thereof. Here, for example, a weight value of 0 out of 10, or 0.00 out of 1.00 may indicate that there is little if any estimated likelihood that the perceived routability constraint represents an actual physical obstacle to navigation. Conversely, a weight value of 10 out of 10 or 1.00 out of 1.00 may indicate that there is little if any doubt that the perceived routability constraint represents an actual physical obstacle to navigation. Hence, assuming a linear scale, a weight value of 5 out of 10, or 0.50 out of 1.00, may indicate that there is a 50% chance that the perceived routability constraint represents an actual physical obstacle to navigation. Those skilled in the art will recognize that other weighting techniques may be implemented in other implementations and/or that such a likelihood logic may be reversed.

In accordance with certain example implementations, a propagation of at least one particle within a particle filtering model and/or the like may be based, at least in part, on a weight value associated with a portion of a line or an object transition. Thus, for example, a particle that may represent a propagated state of a mobile device with regard to an estimated trajectory may be propagated under certain conditions, e.g., in the absence of a perceived routability constraint having some threshold level of a measure of confidence in its path. In certain example implementations, a particle filtering model and/or the like may make use of a routability graph and/or other like information that may relate to feasible paths of navigation within an indoor environment.

Particle filter models have been used to model movement of objects in two or three dimensions, for example. Here, over a time period a "particle" may transition from an initial position and/or state to a subsequent position and/or state in certain directions from the initial position. Possible transitions to particular subsequent positions and/or states may be modeled according to a probability model conditioned on the initial position and/or state. In a particular example, the likelihood that a particle would have a particular subsequent location, velocity and heading may be conditioned on an initial location, velocity and heading for the particle, and possibly, e.g., when applicable, considering information about one or more perceived routability constraints as presented by the example techniques herein.

With this in mind, in accordance with certain other implementations, a perceived routability constraint may correspond to at least one "edge" that identified within a routability graph associated with at least a portion of the displayable image data. For example, a routability graph may identify a plurality of feasible paths running between the locations of particular nodes which may be interconnected by a plurality of "edges" (should not be confused with an edge of a line or an edge of an object transition). One or more edges within a routability graph may correspond to a perceived routability constraint. For example, as illustrated and described in greater detail in subsequent sections, one or more edges within a routability graph may cross over and or nearby a perceived routability constraint, such as a line or object transition, etc. Thus, for example, in certain implementations, in setting a measure of confidence for certain perceived routability constraints, an applicable weight value may be associated with one or more applicable edges within a routability graph. Such a weight value may, for example, identify an estimated likelihood that the perceived routability constraint represents at least part of an actual obstacle within the indoor environment capable of affecting a trajectory of the mobile device in a direction along or possibly parallel and offset from the particular edge within a corresponding region of the indoor environment as represented by a routability graph. In accordance with certain implementations, a propagation of at least one particle within a particle filtering model and/or the like may be affected based, at least in part, on a weight value associated with an edge of routability graph.

In accordance with certain example implementations, such a computing platform may be provided external to the mobile device and at least a measure of confidence may be transmitted to one or more mobile devices. However, in accordance with certain other example implementations, such a computing platform may be provided within the mobile device, which may further estimate or otherwise assist in estimating a trajectory of the mobile device, e.g., based, at least in part, on at least the measure of confidence.

In accordance with certain further example implementations a measure of confidence may be subsequently affected based, at least in part, on received positioning data for the mobile device and/or for one or more other mobile devices, e.g., as result of their previous movement(s) therein within the indoor environment. Positioning data may be estimated, for example, using one or more signal-based positioning techniques, one or more sensor-based positioning techniques, and/or the like or some combination thereof. In certain instances, a positioning data may be estimated, for example, using a particle filtering model and/or the like.

In accordance with certain further example implementations, a measure of confidence may be affected based, at least in part, on an age and/or some other time related information associated with all or part of the electronic map. Thus, for example, a measure of confidence may be reduced over time in certain instances wherein various features (obstacles) may be selectively arranged within an indoor environment may be altered, moved, added, etc., over some period of time. Accordingly, in certain implementations a measure of confidence may be reduced according to some linear and/or non-linear function based on a passage of time.

In accordance with certain example implementations, a mobile device may be provisioned to receive a measure of confidence for at least one perceived routability constraint identified based, at least in part, on displayable image data of an electronic map for an indoor environment, and estimate its trajectory with regard to the indoor environment based, at least in part, on the measure of confidence for the at least one perceived routability constraint.

Attention is drawn now to FIG. 1, which is a schematic block diagram illustrating an example environment 100 that includes a computing device 102 and a mobile device 104 and one or more other mobile devices 104-n, one or more of which may provide or otherwise support mobile device positioning based, at least in part, on one or more perceived routability constraints that may or may not affect movement of a mobile device within an indoor environment 125, in accordance with an example implementation.

As shown, computing device 102 comprises an apparatus 112 to provide or otherwise support mobile device positioning based, at least in part, on a one or more perceived routability constraints that may or may not affect movement of a mobile device 104 within indoor environment 125. Apparatus 112 may represent one or more computing platforms that may communicate with one or more other resources (devices) 130, one or more other mobile devices 104-n, either directly and/or indirectly, e.g. via one or more network(s) 120. Apparatus 112 may communicate with mobile device 104, either directly and/or indirectly, the latter which is illustrated using network(s) 120 and wireless communication link 122. While computing device 102 happens to be illustrated in this example as being located outside of indoor environment 125, it should be recognized that in certain other implementations, all or part of computing device 102 and/or apparatus 112 may be located within indoor environment 125.

Network(s) 120 may comprise one or more communication systems and/or data networks having various interconnected devices supporting communication between computing device 102, one or more other mobile devices 104-n, and one or more other resources (devices) 130. As mentioned, network(s) 120 may further support communication between computing device 102 and mobile device 104, and/or between computing device 102 and one or more other mobile devices 104-n. For example, communication between computing device 102 and mobile device 104 may allow for certain data and/or instructions to be exchanged there between.

As used herein a "mobile device" may represent any electronic device that may be moved about either directly or indirectly by a user within an indoor environment and which may communicate with one or more other devices via one or more wired and/or wireless communication links. Some examples include a cell phone, a smart phone, a computer (e.g., a personal computer such as a laptop computer, tablet computer, a wearable computer, etc.), a navigation aid, a tracking device, a digital book reader, a gaming device, music and/or video player device, a camera, a machine, a robot, etc.

Other resources (devices) 130 may represent one or more computing platforms from which computing device 102 and/or mobile device 104 may receive certain data files and/or instructions, and/or to which computing device 102 and/or mobile device 104 may provide certain data files and/or instructions. For example, in certain instances, all or part of an electronic map and/or the like may be received by computing device 102 and/or mobile device 104 from one or more other resources (devices) 130. For example, in certain instances, all or part of a set of instructions for use in apparatus 112 and/or apparatus 110 may be received from other resources (devices) 130.

Example environment 100 further includes a satellite positioning system (SPS) 150 which may transmit one or more SPS signals 152 to mobile device 104. SPS 150 may, for example, represent one or more GNSS, one or more regional navigation satellite systems, and/or the like or some combination thereof. Additionally, one or more terrestrial-based positioning systems may be provided as represented by example transmitting device(s) 140 capable of transmitting one or more wireless signals 142 all or some of which may be used for signal-based positioning. Thus for example, transmitting device(s) 140 may represent a wireless access point, a base station, a repeater (e.g., for a femto cell, a pico cell, etc., in support of a communication network), a dedicated beacon transmitting device, a personal area network (PAN) device, a Blue tooth device, just to name a few examples, which have known or otherwise identifiable positions. Accordingly, in some implementations, certain example transmitting devices 140 may also comprise a capability to receive wireless (and/or wired) signals. In certain example implementations, a transmitting device 140 may be further capable of connecting to network(s) 120. SPS signals 152 and/or wireless signals 142 may, at times, be acquired by mobile device 104 and used to estimate its position.

As further illustrated example indoor environment 125 may comprise one or more obstacles 160 that may be arranged on a permanent and/or temporary, and/or possibly recurring basis, within indoor environment 125. Obstacles 160 may represent various physical features that may be part of an indoor environment (e.g., a man-made and/or natural structure). For example, obstacles 160 may represent all or part of: one or more walls, one or more ceilings, one or more floors, one or more windows or doors or doorways, one or more elevators, one or more machines, one or more partitions, certain furniture, a staircase, a ladder, an atrium, a cofferdam, a structural member, an non-structural member, a planter, a display case, a work of art, a catwalk, a queuing divider, and/or the like or some combination thereof.

Figure 2:
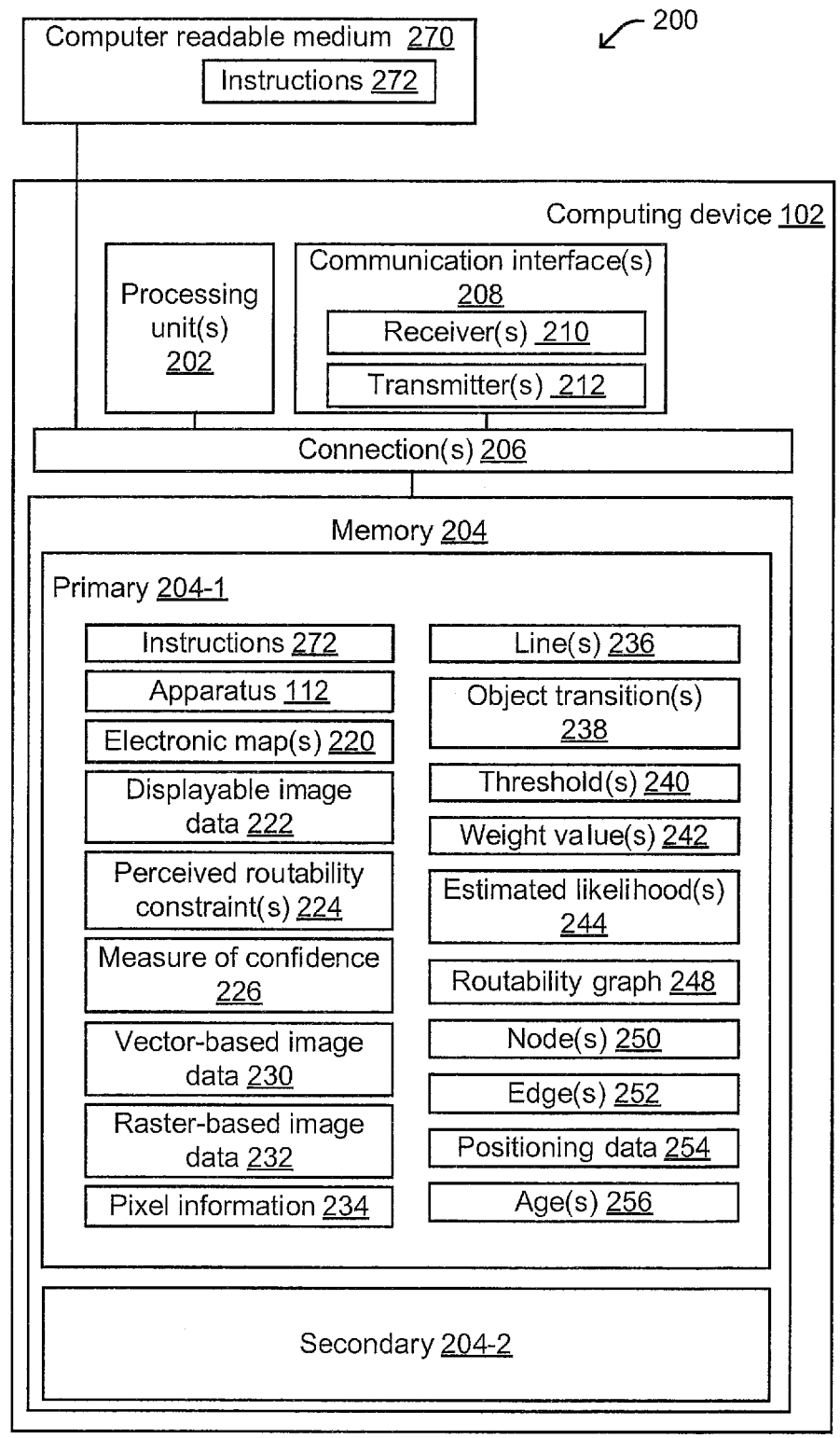
FIG. 2 is a schematic block diagram illustrating certain features of an example computing platform in a computing device to provide or otherwise support mobile device positioning based, at least in part, on one or more perceived routability constraints, in accordance with an example implementation.

Attention is drawn next to FIG. 2, which is a schematic block diagram illustrating certain features of an example computing platform 200 in a computing device 102 to provide or otherwise support mobile device positioning based, at least in part, on one or more perceived routability constraints, in accordance with an example implementation.

As illustrated computing platform 200 may comprise one or more processing units 202 to perform data processing (e.g., in accordance with the techniques provided herein, as part of apparatus 112, etc.) coupled to memory 204 via one or more connections 206. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within computing platform 200. Secondary memory 204-2 may comprise, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to, a non-transitory computer readable medium 270. Memory 204 and/or non-transitory computer readable medium 270 may comprise instructions 272 associated with data processing, e.g., in accordance with the techniques and/or example apparatus 112 (FIG. 1) and/or all or part of example process 1100 (FIG. 11), as provided herein.

Computing platform 200 may, for example, further comprise one or more communication interface(s) 208. Communication interface(s) 208 may, for example, provide connectivity to network(s) 120, mobile device 104, one or more other mobile devices 104-n, and/or other resources (devices) 130 (FIG. 1), e.g., via one or more wired and/or wireless communication links. As illustrated in this example, communication interface(s) 208 may comprise one or more receiver(s) 210, one or more transmitter(s) 212, and/or the like or some combination thereof. Communication interface(s) 208 may implement one or more communication protocols as may be required to support one or more wired and/or wireless communication links.

Processing unit(s) 202 and/or instructions 282 may, for example, provide or otherwise be associated with one or more signals that may be stored in memory 204 from time to time, such as: instructions 272; apparatus 112; one or more electronic maps 220; one or more forms of displayable image data 222 (e.g. associated with one or more electronic maps 220); one or more perceived routability constraints 224 (e.g., associated with certain displayable image data, and/or a corresponding portion of a routability graph 248, such as, one or more nodes 250 and/or one or more edges 252 within a routability graph 248); one or more measures of confidence 226 (e.g., associated with one or more perceived routability constraints 224); one or more forms of vector-based image data 230; one or more forms of raster-based image data 232; one or more forms of pixel information 234 (e.g., one or more pixel values associated with portion of displayable image data 222); one or more identified lines 236; one or more identified object transitions 238; one or more threshold values 240; one or more weight values 242 (e.g. associated with one or more perceived routability constraints 224 and/or one or more measures of confidence 226); one or more estimated likelihoods 244 (e.g., probability values and/or the like associated with one or more measures of confidence 226); one or more routability graphs 248 (e.g., associated with all or part of one or more electronic maps 220); one or more nodes 250; one or more edges 252; positioning data 254 (e.g., associated with one or more mobile devices traversing through all or part of an indoor environment); one or more ages 256 (e.g., time-related information associated with one or more electronic maps 220); and/or the like or some combination thereof.

Figure 3:
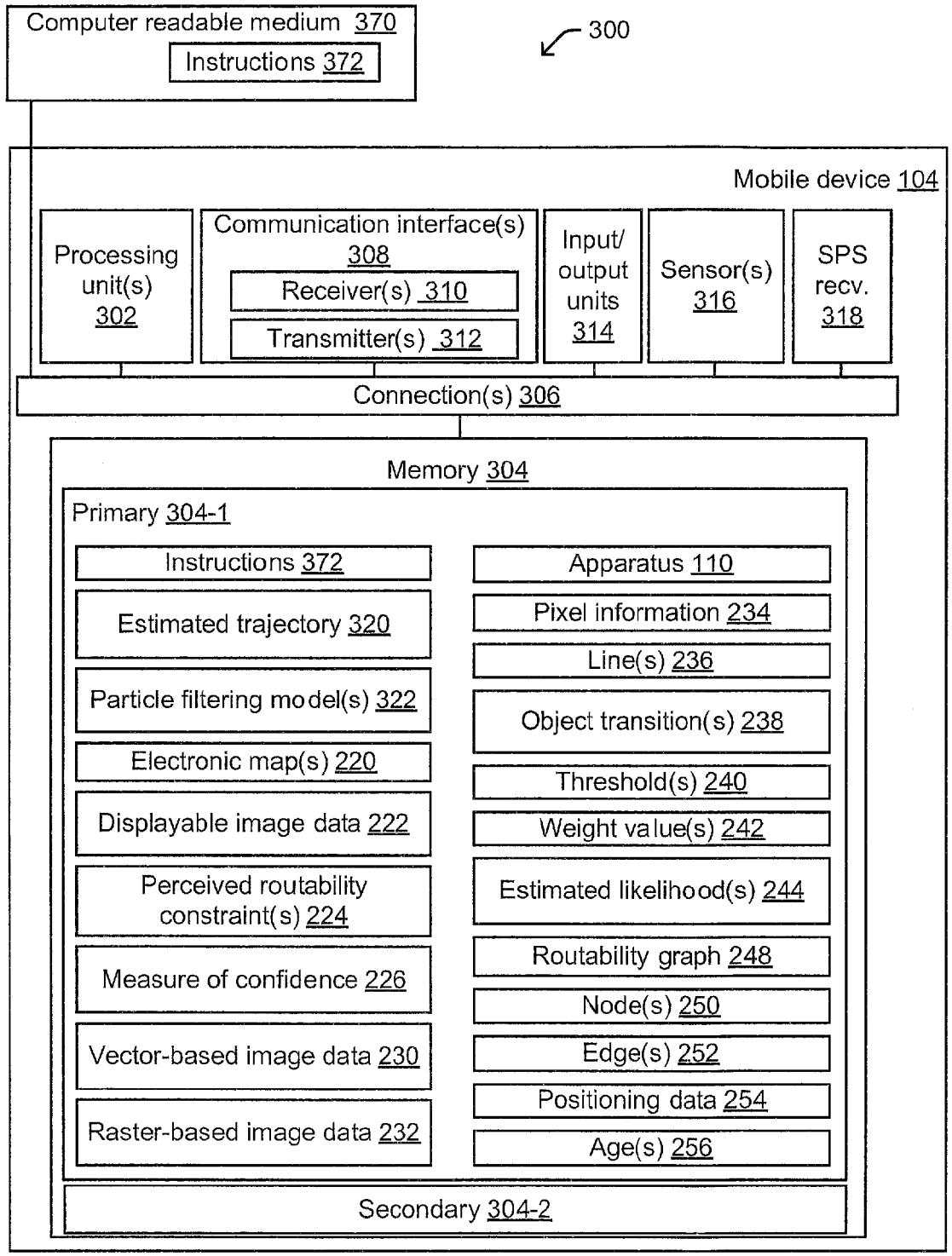
FIG. 3 is a schematic block diagram illustrating certain features of an example computing platform in a mobile device to provide or otherwise support mobile device positioning based, at least in part, on one or more perceived routability constraints, in accordance with an example implementation.

Attention is drawn next to FIG. 3, which is a schematic block diagram illustrating certain features of an example computing platform 300 in a mobile device 104 to provide or otherwise support mobile device positioning based, at least in part, on one or more perceived routability constraints, in accordance with an example implementation.

As illustrated computing platform 300 may comprise one or more processing units 302 to perform data processing (e.g., in accordance with the techniques provided herein, and/or apparatus 110, etc.) coupled to memory 304 via one or more connections 306. Processing unit(s) 302 may, for example, be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile device 104. Secondary memory 304-2 may comprise, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to, a non-transitory computer readable medium 370. Memory 304 and/or non-transitory computer readable medium 370 may comprise instructions 372 associated with data processing, e.g., in accordance with the techniques and/or example apparatus 110 (FIG. 1) and/or all or part of one or more example processes 1100 (FIG. 11) and/or 1200 (FIG. 12), as provided by way of example herein.

Computing platform 300 may, for example, further comprise one or more communication interface(s) 308. Communication interface(s) 308 may, for example, provide connectivity to network(s) 120, computing device 102, one or more other mobile devices 104-n, other resources (devices) 130, and/or one or more transmitting devices 140 (FIG. 1), e.g., via one or more wired and/or wireless communication links. As illustrated here communication interface(s) 308 may, for example, comprise one or more receivers 310, one or more transmitters 312, and/or the like or some combination thereof. Communication interface(s) 308 may implement one or more communication protocols as may be required to support one or more wired and/or wireless communication links. Communication interface(s) 308 may, in certain example instances, further comprise one or more receivers capable of receiving wireless signals 142 from one or more transmitting devices 140 associated with one or more terrestrial-based positioning systems. Further, in certain example instances, mobile device 104 may comprise an SPS receiver 318 capable of receiving and processing SPS signals 152 in support of one or more signal-based positioning capabilities.

In accordance with certain example implementations, communication interface(s) 208, communication interface(s) 308, and/or other resources in network(s) 120 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 208 and/or communication interface(s) 308 may further provide for infrared-based communications with one or more other devices.

Mobile device 104 may, for example, further comprise one or more input/output units 314. In certain implementations, input/output units 314 may be used for receiving perceived routability constraint data. In certain implementations, input/output units 314 may be used to present estimated positioning information to a user of mobile device, and such estimated positioning information may be based, at least in part, on a trajectory of the mobile device within the indoor environment, e.g., as calculated by the various example techniques herein. Here, an example output unit may comprise a speaker or headphone jack that may be used to present estimated positioning information to user via one or more of an audio signal signals. In certain examples, example output unit may comprise a display or other like visual indicator that may be used to present estimated positioning information to a user in some displayable format, e.g., a trajectory overlaid onto part of electronic map, particularly orientated directional arrows, etc. Input/output units 314 may represent one or more devices or other like mechanisms that may be used to receive inputs from and/or provide outputs to one or more other devices and/or a user of mobile device 104. Thus, for example, input/output units 314 may comprise various buttons, switches, a touch pad, a trackball, a joystick, a touch screen, a microphone, a camera, and/or the like, which may be used to receive one or more user inputs. In certain instances, input/output units 314 may comprise various devices that may be used in producing a visual output, an audible output, and/or a tactile output for a user. In one example implementation, input/output units 314 may comprise a display capable of rendering all or part of displayable image data 222 and/or the like.

Mobile device 104 may, for example, comprise one or more sensors 316. For example, sensor(s) 316 may represent one or more inertial sensors, one or more environmental sensors, etc., which may be useful in detecting aspects of the environment 100 and/or mobile device 104. Thus for example, sensor(s) 316 may comprise one or more accelerometers, one or one or more gyroscopes or gyrometers, one or more magnetometers and/or the like, one or more barometers, one or more thermometers, etc. Further, in certain instances sensor(s) 316 may comprise one or more input devices such as a microphone, a camera, a light sensor, etc.

Processing unit(s) 302 and/or instructions 372 may, for example, provide or otherwise be associated with one or more signals that may be stored in memory 304 from time to time, such as: instructions 372; apparatus 110; one or more estimated trajectories 320; one or more particle filtering models 322; one or more electronic maps 220; one or more forms of displayable image data 222; one or more perceived routability constraints 224; one or more measures of confidence 226; one or more forms of vector-based image data 230; one or more forms of raster-based image data 232; one or more forms of pixel information 234; one or more identified lines 236; one or more identified object transitions 238; one or more threshold values 240; one or more weight values 242; one or more estimated likelihoods 244; one or more routability graphs 248; one or more nodes 250; one or more edges 252; positioning data 254; one or more ages 256; and/or the like or some combination thereof. While some the example data and/or instructions as illustrated in FIG. 3 share the same reference numbers as example data and/or instructions as illustrated in FIG. 2, it should be kept in mind that in certain instances all or part of such example data and/or instructions may be distinctly different.

Figure 4:
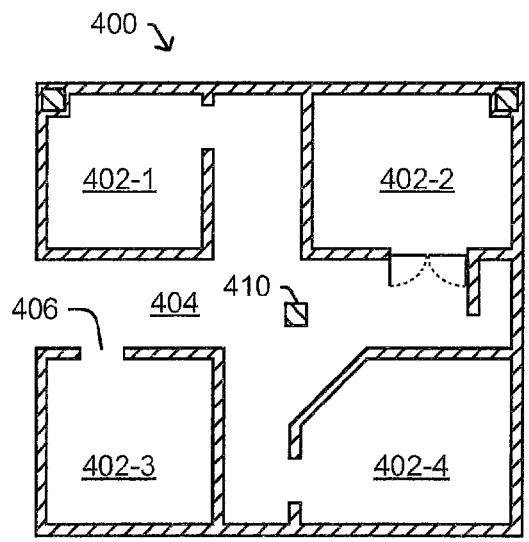
FIG. 4 is a diagram showing certain example physical features of an indoor environment that may be represented in an electronic map and which may act as obstacles to movement of a person within the indoor environment, in accordance with an example implementation.

Attention is drawn next to FIG. 4, which is a diagram 400 showing certain example physical features of an indoor environment that may be represented in an electronic map and which may act as actual obstacles to movement of a person (e.g. carrying mobile device 104) within the indoor environment, in accordance with an example implementation. By way of example, diagram 400 may represent a visual presentation of all or some of the information that may be provided in one or more data files and/or instructions associated with an electronic map and/or which an electronic map may be based, at least in part, for indoor environment.

As presented herein, diagram 400 is intended to illustrate that features within an indoor environment relate to actual physical objects having three-dimensional characteristics, e.g., for example, in diagram 400 various walls and support structures are illustrated as having nontrivial cross-sections.

With this in mind, example diagram 400 presents several features that may constrain the movement of a person carrying a mobile device in some manner while navigating within the indoor environment. Diagram 400 depicts four rooms, 402-1, 402-2, 402-3, and 402-4, which have openings to a common hallway 404. Here for example, room 402-3 is connected to hallway 404 via doorway or other like opening 406. As further illustrated in addition to the walls or other like partitions illustrated in diagram 400, a structural member 410 is also depicted near the center of diagram 400. Hence, as would be expected, a person carrying a mobile device may be able to navigate through part of hallway 404 and possibly enter one or more of the rooms shown via their doorway and/or other like openings. Further, as would be expected, the person carrying a mobile device may be unable to navigate through one of the walls and/or other like partitions, and/or structural member 410. It should be kept in mind that diagram 400 is intended just to provide a simple example of an indoor environment the form of an office building.

Figure 5:
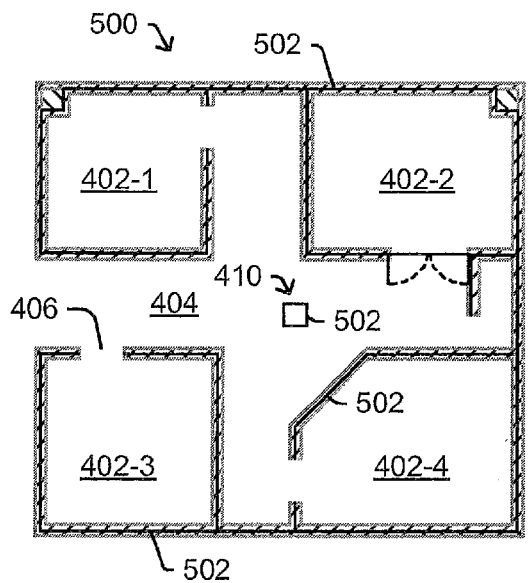
FIG. 5 is a diagram showing an indoor environment as shown in FIG. 4 along with corresponding displayable image data overlaid on certain physical features, in accordance with an example implementation.

Attention is drawn next to FIG. 5, which presents an example diagram 500 showing the features of diagram 400 along with example corresponding displayable image data in the form of lines 502 illustrated as overlaid with their represented physical features, in accordance with an example implementation. As can be seen in this example, while lines 502 used in diagram 500 may be aligned in some fashion with the physical features they represent, some information regarding scale and/or width, etc., may be lost since the lines tend to be thinner than some of the cross-sections of their represented physical features.

Figure 6:
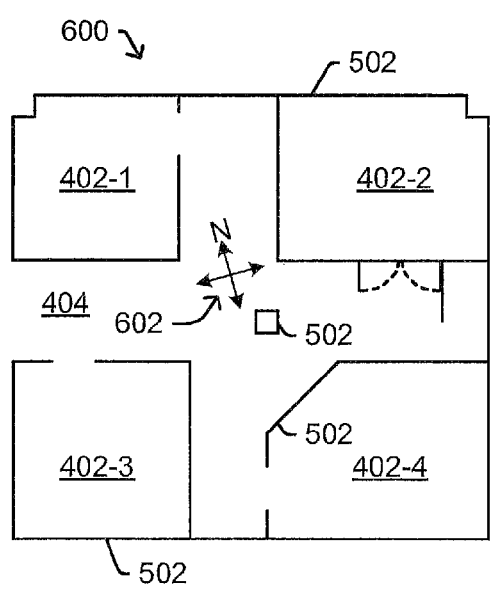
FIG. 6 is a diagram showing an example depiction of displayable image data as in FIG. 5 that has been further intentionally annotated with additional displayable image data that may not represent physical features, in accordance with an example implementation.

Attention is drawn next to FIG. 6, which is a diagram 600 showing an example depiction of displayable image data based on the representative lines 502 from diagram 500. As further illustrated, in certain implementations displayable image data as in diagram 600 may be further intentionally annotated and/or otherwise altered in some manner based, at least in part, additional displayable image data that may or may not be related to the represented physical features. Here, for example, diagram 600 has been further intentionally annotated include a compass orientation key 602. In other implementations, displayable image data may include additional information such as building and/or room names, or other identifying information that may be of use to a person or machine reading or otherwise accessing the displayable image data. In certain example implementations, all or part of the displayable image data associated with diagram 600 may comprise vector-based image data. Hence, as is known, vector-based image data may support various levels of scaling during rendering of an image.

Figure 7:
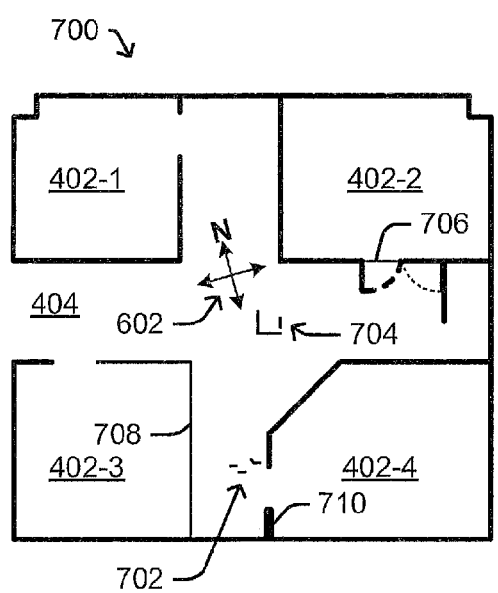
FIG. 7 is a diagram showing an example depiction of displayable image data as in FIG. 6 further illustrated with unintended additional displayable image data and/or distorted displayable image data, in accordance with an example implementation.

Attention is drawn next to FIG. 7, which is a diagram 700 showing an example depiction of displayable image data as in diagram 600 but which is further illustrated as having certain example unintended additional displayable image data and/or distorted displayable image data that may or may not be related to actual physical features of the indoor environment and/or any intentional annotation or other like added information, in accordance with an example implementation.

By way of example, diagram 700 may represent some form of displayable image data that may be less precise than vector-based image data and/or other like drawing/renderings, as a result of one or more data conversion processes and/or scanning or photocopying processes. Thus, for example, diagram 600 (FIG. 6) may represent a more precise electronic map (e.g., which may comprise vector-based image data and/or or the like) and diagram 700 may represent a less precise, possibly more noisy, corresponding electronic map (e.g., which may comprise raster-based image data and/or the like).

Hence, diagram 700 may represent a scanned version, or possibly a converted file format of diagram 600, etc.

As illustrated, diagram 700 may comprise spurious attributes or other like noise as represented by items 702. As may be appreciated, items 702 do not relate to any represented physical features of the indoor environment. Nonetheless, in certain implementations, certain items such as items 702 may be identified as perceived routability constraints which may affect trajectory estimation's and/or other like positioning data. However, as presented by the various techniques herein, it may be possible to reduce or avoid the impact of such perceived routability constraints based, at least in part, on a measure of confidence that may be identified. Thus, for example, in accordance with certain implementations certain items, such as example items 702, may not be identified as a perceived routability constraint in the first place, unless they meet certain threshold requirements (e.g., relating to aspects such as length, width, number of adjacent or grouped pixels, similar/dissimilar pixel values, additional knowledge that may be provided by previously received positioning data for one or more mobile devices within the indoor environment, etc.).

Other example distortions or other like changes that may occur due to various processing techniques are illustrated in diagram 700 as well. For example, item 704 in diagram 700 illustrates that the full shape of structural member 410 (e.g., see diagrams 400 and 500) may not have been converted properly at some information has been lost. For example, items 706, 708 and 710 illustrate that line widths may be altered as result of being converted. Here for example, item 706, which represents one of the (closed) doors leading into a room, appears thinner in width than the other (closed) door leading into the same room. Here for example, item 706 which represents a wall appears thinner in width than the other related walls. Conversely, for example, item 710 which also represents a wall appears thicker in width than the other related walls.

It should be recognized that the foregoing present just a few examples and that in certain implementations various forms of data conversion and/or other like processes may result in various other items, alterations, aberrations, etc. In certain other instances, it may be possible for such data conversions and/or other like processes to not add any deleterious items to displayable image data, indeed, in certain implementations a resulting displayable image data may actually represent an improvement over previous form based on techniques that cleanup remove noise and/or seek to make other changes.

Figure 8:
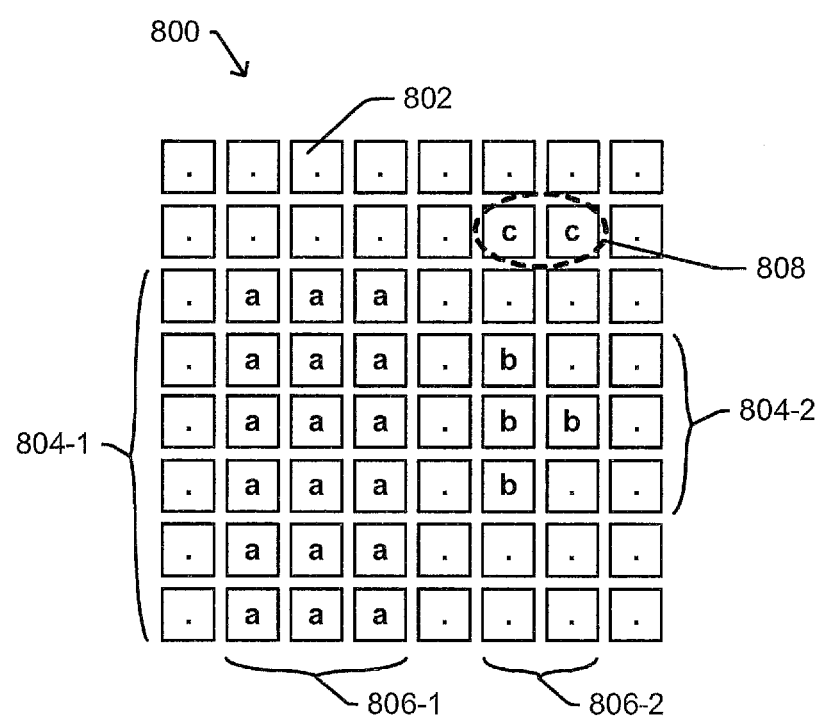
FIG. 8 is a diagram showing an example pixel array that may be used to display displayable image data, in accordance with an example implementation.

Attention is drawn next to FIG. 8, which is a diagram showing an example pixel array 800 that may be used to display displayable image data, in accordance with an example implementation. In this example pixels are illustrated as having a square shape and arranged in pixel array 800 and uniform rows and columns. The pixel values used to render a display via pixel array 800 are illustrated as belonging to four different categories. The first category of pixel values are marked with a period ("."), the second category of pixel values are marked with a letter "a", the third category of pixel values are marked with a letter "b", and the fourth category of pixel values are marked with a letter "c". Thus, for example, pixel values within a given category may be similar in some manner with each other and dissimilar in some distinguishing manner to pixel values and other categories. With this in mind, for example, the first category of pixel values (e.g., such as pixel 802) may represent a background color, intensity, etc.); the second category of pixel values (e.g., the letter "a" pixels may represent an intended line or an object transition that may have a particular color, shade, intensity, etc.); the third category of pixel values (e.g., the letter "b" pixels may represent an unintended item that may have a particular color, shade, intensity, etc., which may or may not be different from that of the letter "a" or "c" pixels); and/or the fourth category of pixel values (e.g., the letter "c" pixels may represent an unintended item (e.g., noise) that may have a particular color, shade, intensity, etc., which may or may not be different from that of the letter "a" or "b" pixels).

As illustrated, the letter "a" pixels are arranged adjacent and as a group appear to form a line having width 806-1 and at least a length equal to or greater than length 804-1. Thus, in certain example implementations, such letter "a" pixels may be compared to one or more threshold values to determine whether or not they represent a perceived routability constraint. Here, for example, one or more threshold values may be based on a minimum pixilated line measurement which may be compared to length 804-1. Here, for example, one or more threshold values may be based on a minimum pixilated object transition measurement which may be compared to width 806-1. Further, for example, one or more threshold values may be based on a maximum pixilated noise measurement that may be compared to a number of adjacent otherwise grouped letter "a" pixels. In this example, it is assumed there for that the example letter "a" pixels are identified as a perceived routability constraint. In certain example implementations a measure of confidence associated with such perceived routability constraint may be affected (e.g., at least initially set higher to represent an estimated likelihood that it may represent an obstacle) based on the number of threshold test(s) that may be satisfied.

However, in this example, the same may not be true for letter "b" and/or letter "c" pixels. Here, for example, letter "b" pixels may be compared to one or more threshold values to determine whether or not they represent a perceived routability constraint. Thus, for example, one or more threshold values may be based on a minimum pixilated line measurement which may be compared to length 804-2. Here, for example, one or more threshold values may be based on a minimum pixilated object transition measurement which may be compared to width 806-2. Further, for example, one or more threshold values may be based on a maximum pixilated noise measurement that may be compared to a number of adjacent otherwise grouped letter "b" pixels. In this example, it is assumed that the example letter "b" pixels may satisfy at least one threshold test and as such may be identified as a perceived routability constraint. For example, let us assume that the example letter "b" pixels, of which there are four (4), may satisfy at least one threshold test based on a maximum pixilated noise measurement that is set to three (3). However, in certain example implementations a measure of confidence associated with such perceived routability constraint may be affected (e.g., at least initially set low to represent an estimated likelihood that it may not represent an obstacle) based on such a barely-satisfied threshold test(s) and/or possibly one or more other failed threshold tests.

In this example, letter "c" pixels may be compared to one or more threshold values to determine whether or not they represent a perceived routability constraint. Thus, for example, one or more threshold values may be based on a minimum pixilated line measurement which may be compared to grouped pixels 808 which have a nominal length of one (1) pixel. Here, for example, one or more threshold values may be based on a minimum pixilated object transition measurement which may be compared to grouped pixels 808 which have a width of 806-2. Further, for example, one or more threshold values may be based on a maximum pixilated noise measurement that may be compared to a number of adjacent otherwise grouped pixels 808, of which there are two (2). In this example, it is assumed that the example letter "c" pixels may fail to satisfy all of the threshold test(s) that may be applied, and as such may not be identified as a perceived routability constraint.

It should be understood that, while the example pixel array 800 illustrates only a small set of pixels, perceived routability constraints in the form of lines, object transitions, etc., may relate to groupings of hundreds or thousands of pixels. Indeed, as may be appreciated, a measure of confidence associated with a perceived routability constraint may be set to represent a higher estimated likelihood that the perceived routability constraint represents an actual physical obstacle to navigation as the grouping of pixels increases and/or peers to adhere or otherwise conform to certain expected design criteria. As such, in certain examples, one or more measures of confidence for one or more perceived routability constraints for a line, an object transition, or some other grouping of pixels may relate to its length and/or width, or possibly its a direction, or shape, pattern, color etc., relative to certain other lines, object transitions, or other groupings of pixels.

In certain implementations, one or more measures of confidence for one or more perceived routability constraints for a line, an object transition, or some other grouping of pixels may relate to its arrangement with regard to certain other lines, object transitions, or other groupings of pixels. Here, for example, measures of confidence for perceived routability constraints associated with interconnected lines (e.g., representing the walls defining and/or located within an indoor environment) may reflect a strong or high estimated likelihood that such perceived routability constraints represents an actual physical obstacles to navigation. Conversely, for example, a measure confidence for a perceived routability constraint that appears to standalone from other perceived routability constraints (e.g., representing a structural member 410 (FIG. 5)) may, in certain instances, at least initially reflect a relatively weaker or lower estimated likelihood that such perceived routability constraint represents an actual physical obstacles navigation. Indeed, it should be recognized that while a structural member 410 clearly represents a physical obstacle that a person would navigate around, in certain implementations such a minor deviation in a trajectory may not affect an estimated overall trajectory. Nonetheless, in certain implementations it may be beneficial to identify that such perceived routability constraints (here, e.g., structural members) may be common to an indoor environment (e.g., having similar shapes, possibly arranged according to some particular pattern, etc.), and hence it may be beneficial to set the applicable measures of confidence to reflect that such perceived routability constraints may strongly represent physical obstacles navigation.

Figure 9:
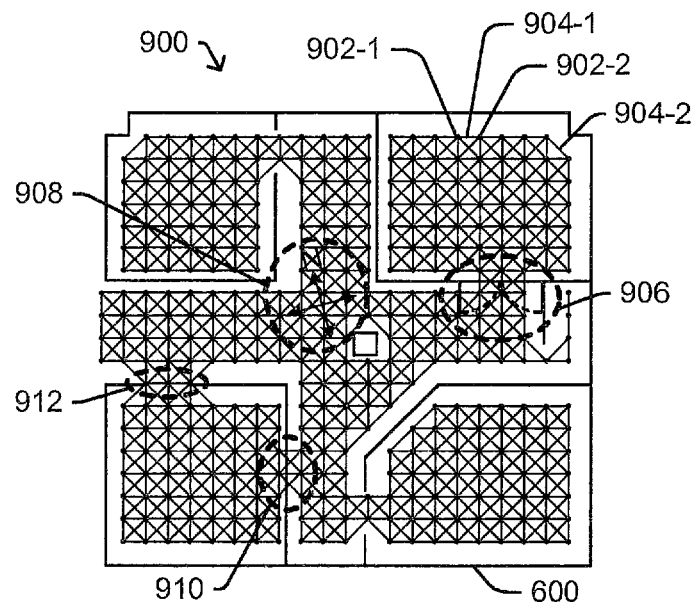
FIG. 9 is a diagram showing an example depiction of displayable image data as in FIG. 6 and a corresponding routability graph, in accordance with an example implementation.

Attention is drawn next to FIG. 9, which is a diagram 900 showing an example depiction of displayable image data as in FIG. 6 and a corresponding routability graph which may conform to one or more perceived routability constraints based, at least in part, on a measure of confidence with regard to features in the electronic map and/or certain edges in the routability graph, in accordance with an example implementation.

In this example, the routability graph is illustrated based on a two-dimensional grid pattern comprising a plurality of grid points or nodes such as nodes 902-1 and 902-2, which are neighboring nodes to one another and as illustrated connected by an edge 904-1. As will be appreciated, in this example, horizontal and vertical aligned edges will share a common edge length, and similarly, and diagonal aligned edges, e.g., such as edge 904-2, will also share another common edge length which will be longer than the common edge length of the horizontal and vertical aligned edges. In other implementations, different shaped grid patterns may be used, which may or may not be uniform and one or more its dimensions.

As can be seen the routability graph is intended to represent feasible paths for a person carrying a mobile device within the representative indoor environment. Thus, for example, a trajectory of a mobile device may be estimated as traveling from one node to an adjacent node via a particular edge and interconnecting nodes.

Figure 10:
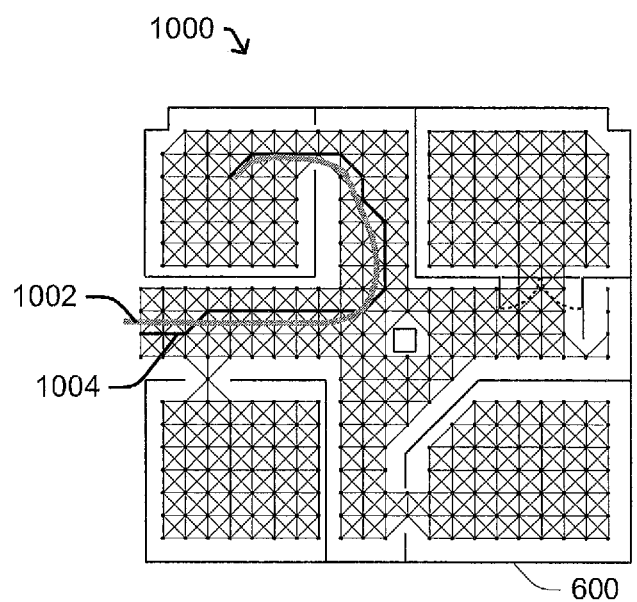
FIG. 10 is a diagram showing an example depiction of displayable image data and routability graph as in FIG. 9, and further illustrating a simulated trajectory and a possible estimated trajectory of a mobile device with respect to the routability graph in the example indoor environment, in accordance with an example implementation.

For example, reference is made next to FIG. 10, which is a diagram 1000 showing an example depiction of displayable image data and routability graph as in diagram 900, and further illustrating a simulated trajectory 1002 and a possible estimated trajectory 1004 of a mobile device with respect to the routability graph in the example indoor environment, in accordance with an example implementation.

Returning back to diagram 900 in FIG. 9, various items, intentionally added and/or unintentionally added such as those illustrated in FIGS. 6 and 7 may be identified, at least initially, as perceived routability constraints. For example, region 906 shows that all or part of one or more of the illustrated opened and/or closed doors and/or their pivoting movement lines may be identified as one or more perceived routability constraints. For example, region 908 shows that all or part of a compass orientation key may be identified as one or more perceived routability constraints. For example, region 910 shows that all or part of a corrupted or otherwise unintentionally affected line width or object transition width, etc., may not be identified as presenting one or more perceived routability constraints. For example, region 912 shows that all or part of a corrupted or otherwise unintentionally affected line length or object transition length, etc., may not be identified as presenting one or more perceived routability constraints.

Example diagram 1000, in FIG. 10, illustrates the routability graph which correctly accounts for perceived routability constraints, when compared to example diagram 900. For example, in diagram 1000 a measure of confidence associated with all or part of illustrated opened and/or closed doors and/or their pivoting movement lines, and/or the overlying nodes and edges in the routability graph may be initially set and/or subsequently affected to reduce an estimated likelihood that there is a corresponding physical feature that may act as an obstacle to navigation. Hence, as illustrated by the routability graph in diagram 1000 it is possible for an estimated trajectory to allow for navigation through the doors in region 906 (FIG. 9), e.g., assuming that the person may open and close the doors as needed. Similarly, for example, one or more perceived routability constraints based on all or part of a compass orientation key in region 908 (FIG. 9), may be initially set and/or subsequently affected to reduce an estimated likelihood that there is a corresponding physical feature that may act as an obstacle to navigation.

Further, as illustrated in example diagram 1000, additional perceived routability constraints may be identified and/or measures of confidence associated there with may be affected over time based on received positioning data from one or more mobile devices in an effort to the routability graph and/or electronic map with regard to example defects as illustrated in regions 910 and 912 of diagram 900. Thus, for example, a routability graph and/or corresponding portions of the displayable image data electronic map may be refined or otherwise affected to a more precisely identify perceived routability constraints and said applicable measures of confidence thereto with regard to the actual dimensions of physical obstacles and/or other features that may be part of an indoor environment.

The routability graph in example diagram 1000 depicts a fairly refined set of nodes and edges that may be associated with feasible paths through the indoor environment. Thus, for example, nodes and/or edges that overlap or cross certain obstacles have been removed from the grid pattern leaving only those associated with feasible paths. It should be understood that in accordance with certain implementations decisions as to whether a particular note and/or edge may or may not be removed may be based, at least in part, on the perceived routability constraints identified within the displayable image data, and more particularly, based on the corresponding measures of confidence associated with those perceived routability constraints.

In certain example implementations, a measure of confidence may be associated with a perceived routability constraint identified in the displayable image data. For example, a plurality of pixels associated with certain lines and/or object transitions may be identified in the displayable image data as perceived routability constraints. For each perceived routability constraint, a measure of confidence may be determined. A measure of confidence may, for example, relate to an estimated likelihood that a perceived routability constraint may or may not represent an actual obstacle to navigation.

An estimated likelihood that a perceived routability constraint may or may not represent an actual obstacle to navigation may take into account a variety of factors or other considerations that may be received from electronic map and/or other information that may be received, such as, e.g. positioning data from the mobile device and/or one or more other mobile devices as result of having been carried by person navigating within the indoor environment. For example, an estimated likelihood that the perceived routability constraint may represent an actual obstacle may be based, at least in part, on the number of pixels and/or some other aspect associated with a grouping and/or other like arrangement of pixels, and/or certain characteristics of pixel values associated there with. For example, an estimated likelihood that a perceived routability constraint represents an actual obstacle may be increased as the number of pixels, etc., associated with the perceived routability constraint increases. Thus, for example, an estimated likelihood may be increased as a result of identifying lines and/or object transitions that are longer in length and/or wider in width. Thus, for example, an estimated likelihood may be reduced as result of identifying lines and/or object transitions that are relatively shorter in length and/or narrower in width.

Further, in certain examples, an estimated likelihood may be increased for lines and/or object transitions that appear to adhere to certain common and/or otherwise expected characteristics, e.g., directions, shapes, patterns, colors, shades, layer(s) (e.g., in the displayable image data), and/or the like or some combination thereof. Conversely, an estimated likelihood may be decreased for lines and/or object transitions that do not appear to adhere to certain common and/or otherwise expected characteristics. By way of example, in certain implementations the arrangement of certain walls and other obstacles within an indoor environment may adhere to certain design criteria, such as, e.g., one or more geometric patterns wherein the resulting rooms and other indoor spaces have fairly straight walls, possibly parallel opposing walls, etc. In certain other implementations, indoor environment may adhere to some other design criteria wherein certain walls may be curved in some manner, etc. Accordingly, an estimated likelihood may be increased based, at least in part, on a determination that the perceived routability constraint (here, e.g., a line and/or object transition, etc.) appears to adhere to some identified design criteria along with other perceived routability constraints. Conversely, an estimated likelihood may be decreased based, at least in part, on a determination that the perceived routability constraint does not appear to adhere to some identified design criteria that may be exhibited by other perceived routability constraints.

In accordance with certain implementations, a measure of confidence with regard to a perceived routability constraint may be represented by one or more weight values that may be associated with the perceived routability constraint. Thus for example, waiting values may be associated with one or more pixel values within displayable image data. Thus, for example, in estimating a trajectory of a mobile device within the indoor environment, one or more weight values that may be associated with the perceived routability constraint may be considered in determining whether a candidate trajectory may be possible or possibly inhibited due to one or more obstacles to navigation.

In accordance with certain other implementations, a measure of confidence with regard to a perceived routability constraint may be represented by one or more weight values that may be associated with one or more nodes and or edges of a routability graph that may be overlapping, crossing, near, adjacent, and/or otherwise associated with the perceived routability constraint. Thus, for example, in estimating a trajectory of a mobile device within the indoor environment, one or more weight values that may be associated with an edge of a routability graph crossing over and/or near by a perceived routability constraint may be considered in determining whether a candidate trajectory along or nearby such edge may be possible or possibly inhibited due to one or more obstacles to navigation.

As previously mentioned, in certain implementations, a particle filtering model and/or the like may be implemented in which particles which may be propagated forward in time may represent candidate trajectories. Here, for example, one or more weight values and/or other like information associated with a perceived routability constraint and/or an applicable edge in a routability graph may affect the particle filtering model accordingly.

Figure 11:
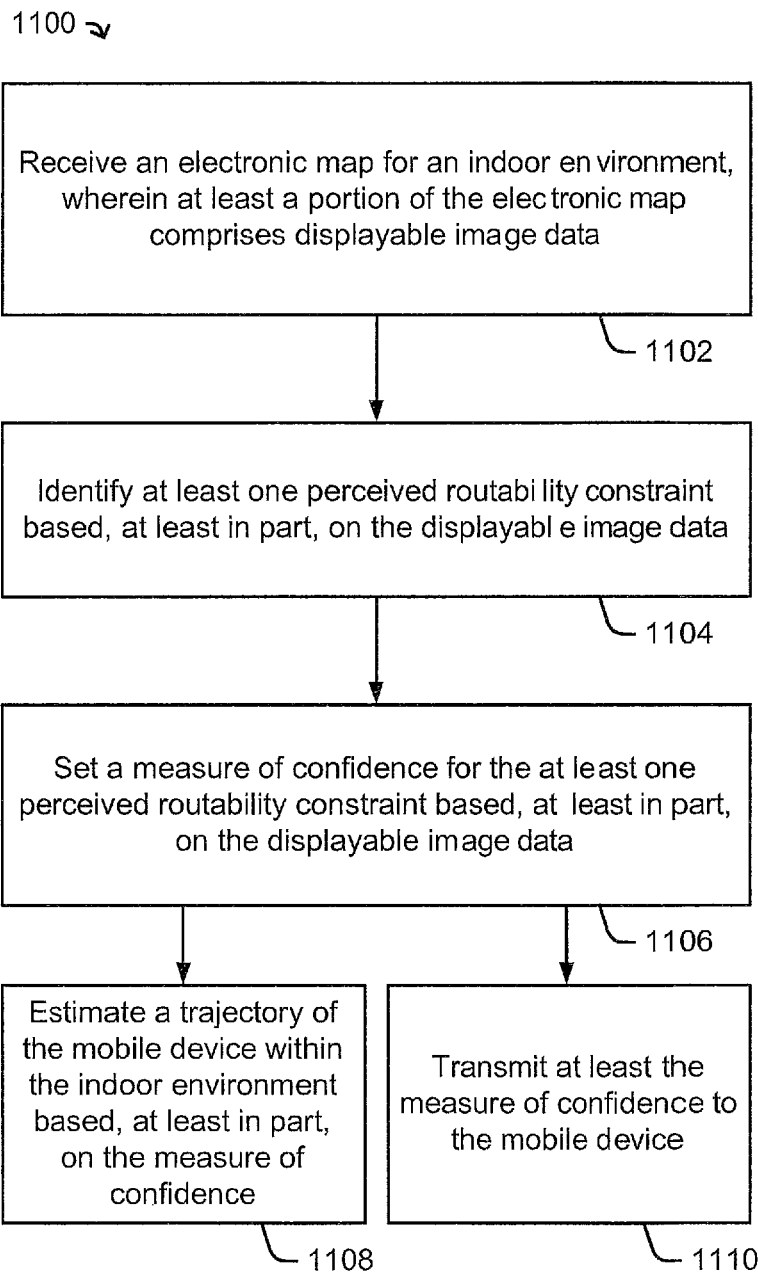
FIG. 11 is a flow diagram illustrating an example process that may be implemented in whole or in part in a computing platform of a computing device and/or a mobile device to provide or otherwise support mobile device positioning based, at least in part, on one or more perceived routability constraints that may or may not affect movement of a mobile device within an indoor environment, in accordance with an example implementation.

Attention is drawn next to FIG. 11, which is a flow diagram illustrating an example process 1100 that may be implemented in whole or in part in a computing platform of a computing device and/or a mobile device to provide or otherwise support mobile device positioning based, at least in part, on one or more perceived routability constraints that may or may not affect movement of a mobile device within an indoor environment, in accordance with an example implementation.

At example block 1102, an electronic map for an indoor environment may be received. Here, for example, an electronic map may comprise one or more data files having data and/or instructions therein. For example, electronic map may comprise one or more forms of displayable image data, and/or may comprise instructions that may be used to determine one or more forms of displayable image data. In certain implementations, all or part of an electronic map may be received from a memory, and/or one or more external devices, and/or the like or some combination thereof. In certain implementations, displayable image data may comprise vector-based image data, raster-based image data, etc. in certain implementations, various conversion and/or transformation processes may be implemented to obtain all or part of such displayable image data.

At example block 1104, at least one perceived routability constraint may be identified based, at least in part, on at least a portion of the displayable image data. Here, for example, one or more lines and/or object transitions may be identified and possibly identified as one or more perceived routability constraints based, at least in part, on one or more threshold values and/or related or other like tests. For example as mentioned above in certain implementations certain threshold values may take into consideration a minimum pixilated line measurement, a minimum pixilated object transition measurement, a maximum pixilated noise measurement, and/or the like or some combination thereof. Further, as mentioned, the additional information regarding common and/or expected patterns, shapes, positions, colors, etc., possibly associated with certain design criteria for an indoor environment, may also be taken into consideration in one or more tests.

At example block 1106, a measure of confidence may be set for a perceived routability constraint, e.g., based, at least in part, on the displayable image data. Thus, for example, as mentioned a measure of confidence may represent an estimated likelihood that a perceived routability constraint represents an actual obstacle to navigation. Hence, such measure of confidence may be based, at least in part, on certain characteristics of the perceived routability constraint within the displayable image data. For example as previously mentioned, in certain instances an estimated likelihood may increase for lines and/or object transitions that may be of certain longer lengths, wider widths, particular shapes or colors, represented in certain layers, possibly tagged with metadata of certain types, adhering to certain expected design criteria, etc. Conversely, as previously mentioned in certain instances an estimated likelihood may be decrease for lines and/or object transitions that may be of certain shorter lengths, narrower widths, and/or which may not adhere to certain expected design criteria, etc. In certain example implementations, a measure of confidence may be associated with a perceived routability constraint in the displayable image data. In certain example implementations, a measure of confidence may also or alternatively be associated with an applicable edge of a routability graph.

In accordance with certain implementations, a measure of confidence may represent some numerical value. In other implementations, a measure of confidence may represent some non-numerical value that may serve the same or similar purpose as a numerical value. By way of example, in certain implementations a measure of confidence may be indicated by a numerical-based weight value between 0 and 100, wherein 0 represents a 0% estimated likelihood that a perceived routability constraint represents an actual obstacle to navigation and a 100 represents a 100% estimated likelihood that the perceived routability constraint represents an actual obstacle to navigation. In another example, a measure of confidence may be indicated by a non-numerical-based weight value, such as, e.g., "H", "M" and "L", which may represent, respectively, high, medium, and low estimated likelihoods that a perceived routability constraint represents an actual obstacle to navigation. Of course it should be recognized that these are just a few examples and claimed subject matter is not intended to be limited in this manner.

If process 1100 is performed by a computing platform at the mobile device, then at example block 1108, at least the measure of confidence may be made used to estimate a trajectory of a mobile device within the indoor environment. In certain example implementations, a measure of confidence may comprise a weight value associated with all or part of the displayable image data portion of an electronic map. In certain example implementations a measure of confidence may comprise a weight value associated with one or more edges of a routability graph corresponding to an electronic map. In certain implementations, electronic map may comprise all or part of the routability graph associated there with. Further, as mentioned in certain implementations and electronic map may comprise all or part of one or more data files that may comprise data and/or computer implementable instructions.

If process 1100 is performed by a computing platform external to the mobile device then, at example block 1110, at least the measure of confidence may be transmitted to the mobile device, e.g., for use by the mobile device in estimating its trajectory within the indoor environment.

Figure 12:
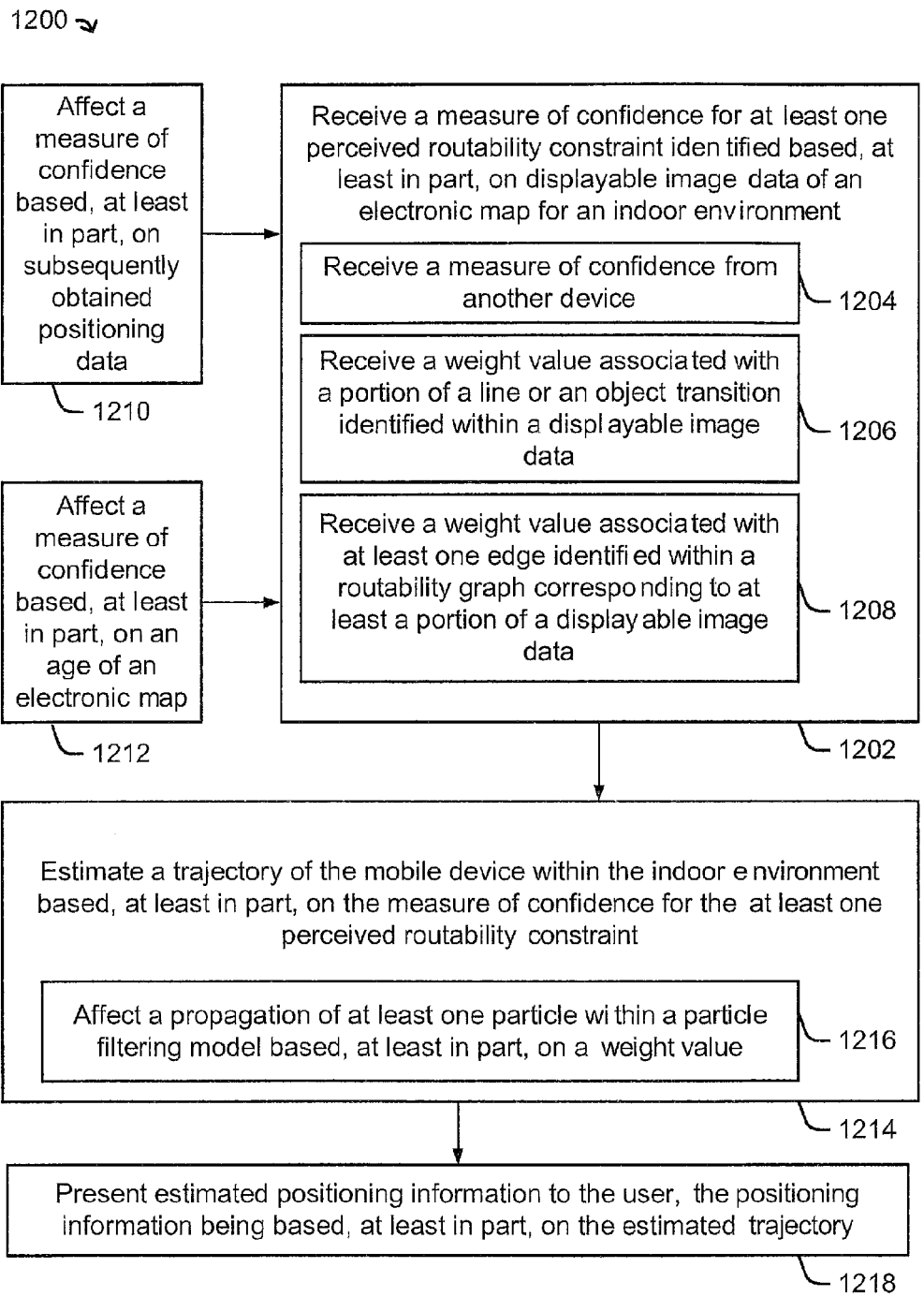
FIG. 12 is a flow diagram illustrating an example process that may be implemented in whole or in part in a computing platform of a mobile device to provide or otherwise support mobile device positioning based, at least in part, on one or more perceived routability constraints that may or may not affect movement of a mobile device within an indoor environment, in accordance with an example implementation.

Attention is drawn next to FIG. 12, which is a flow diagram illustrating an example process 1200 that may be implemented in whole or in part in a computing platform of a mobile device to provide or otherwise support mobile device positioning based, at least in part, on one or more perceived routability constraints that may or may not affect movement of a mobile device within an indoor environment, in accordance with an example implementation.

At example block 1202, a measure of confidence for at least one perceived routability constraint may be received by the mobile device. Here for example, a perceived routability constraint may be identified based, at least in part, on displayable image data of an electronic map for an indoor environment. In certain implementations, a measure of confidence and/or a perceived routability constraint may be received from one or more other devices, e.g., using all or part of a process 1100. In certain other implementations, a mobile device may itself set a measure of confidence and/or a perceived routability constraint, e.g., using all or part of a process 1100. As previously mentioned, a measure of confidence may, for example, be associated with displayable image data for the perceived routability constraint and/or an applicable edge within a routability graph.

As previously mentioned in the various examples presented herein, in certain implementations, as part of block 1202, e.g., at example block 1204, a measure of confidence may be received from another device. In certain example implementations, as part of block 1202, e.g., at example block 1206, a weight value may be received which is associated with a portion of a line or an object transition identified within a displayable image data. In certain example implementations, as part of block 1202, e.g., at example block 1208, a weight value may be received which is associated with at least one edge identified within a routability graph corresponding to at least a portion of a displayable image data.

In certain implementations, a measure of confidence for at least one perceived routability constraint may be affected. Here, for example at block 1210, a measure of confidence may be affected based on positioning data received by the mobile device and/or from one or more other mobile devices, and/or other computing platforms. Thus for example, a measure of confidence may change based on the feedback provided by such positioning data.

In another example, at block 1212, a measure of confidence may be affected based on an age or some other information associated with the electronic map and/or the like. Thus for example, a measure of confidence may change over time as the underlying information ages. Here, for example, an office layout which uses cubicles or other movable obstacles may change over time and hence an electronic map may be less reliable as it ages.

At example block 1214, a trajectory of the mobile device within the indoor environment may be estimated, e.g., based, at least in part, on at least one measure of confidence for at least one perceived routability constraint. Thus, for example at block 1216, a weight value associated with part of the displayable image data and/or applicable edge of a routability graph may be used to affect a particle filtering model and/or the like which may be used to estimate a trajectory along a feasible path within an indoor environment taking into account obstacles to navigation that may be present therein. By way of example, a particle filtering model and/or the like may take into consideration certain positioning information that may be received using signal-based positioning techniques, inertial sensor positioning techniques, environmental sensor positioning techniques, user input positioning techniques, and/or the like or some combination thereof.

At example block 1218, estimated positioning information may be presented to the user (e.g., via one or more output units), wherein the estimated positioning information is based, at least in part, on the estimated trajectory. Thus, for example, in certain implementations one or more audio and/or visual cues may be provided to a user by one or more of the mobile device's output units to inform the user in some manner with regard to positioning and/or navigation. Hence, for example in certain implementations, an estimated position and/or trajectory or other information may be presented via a visible display and/or audible signal along with other details regarding the indoor environment as encoded in an electronic map thereof.

In certain example implementations, an estimated trajectory of a mobile device may be computed subject to constraints set forth in a routability graph and according to a motion model such as a particle filtering model and/or the like. Here, for example, "particles" may represent possible motion states (e.g., location, speed, heading, etc.) that may be updated or computed by incorporating new measurements (e.g., by ranging to transmitters at fixed locations, processing signals generated by inertial and/or environmental sensors, etc.). For example, probabilities assigned to particles may be updated or propagated based, at least in part, on new measurements. These probabilities may be affected by a current motion state relative to routing constraints. Erroneous routing constraints (e.g., from erroneous map features) may adversely affect or skew probabilities applied to particles, which may distort the computation of trajectories based, at least in part, on the propagated particles. In a particular example, raster-based image data may, at times, be fuzzy, which may leave certain represented features difficult to identify. The difference and/or transitional demarcation between walls and other features such as stairs, furniture and doors may therefore be unclear. Also, maps may be out of date (e.g. remodeling has moved the walls) or otherwise incorrect.

Current binary approaches tend to assume that either there is an obstacle, across which no movement is allowed, or no obstacle exists, in which case movement is free. If a path is incorrectly considered infeasible (due to a presumed obstacle), then no movement is allowed, e.g. particles in particle filter are not allowed to cross. This may results in trapping of particles, and grossly incorrect position estimates. With current approaches, to be conservative, one may decide to simply err on the side of NOT imposing an obstacle to navigation, but doing so tends to significantly dilute the effect of available information.

As presented in some of the example techniques herein, a soft trade-off between accuracy of map/assistance data and accuracy of estimates may be achieved in certain instances by using one or more corresponding measures of confidence with regard to one or more perceived routability constraints. Such measures of confidence may, for example, be applied as weight values which may be applied to and/or otherwise considered in some manner within propagating or otherwise updating particles accordingly.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as processing, computing, calculating, determining, establishing, generating, obtaining, accessing, identifying, setting, applying, associated, and/or the like may refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for supporting mobile device positioning on a mobile device, the method comprising:
   receiving an electronic map for an indoor environment, wherein at least a portion of said electronic map comprises displayable image data;
   selecting at least one perceived routability constraint based, at least in part, on said displayable image data;
   setting a measure of confidence for said at least one perceived routability constraint based, at least in part, on said displayable image data, wherein the measure of confidence corresponds to an estimated likelihood that said at least one perceived routability constraint represents an actual physical obstacle to navigation; and
   estimating a trajectory of said mobile device within said indoor environment based, at least in part, on said measure of confidence.

2. The method as recited in claim 1, wherein at least a portion of said displayable image data comprises vector-based image data.

3. The method as recited in claim 1, wherein at least a portion of said displayable image data comprises raster-based image data.

4. The method as recited in claim 1, wherein at least a portion of said displayable image data represents a plurality of pixels corresponding to at least a portion of a line or an object transition, and wherein selecting said at least one perceived routability constraint further comprises:
   selecting at least said plurality of pixels as said at least one perceived routability constraint based, at least in part, on one or more threshold values.

5. The method as recited in claim 4, wherein at least one of said one or more threshold values is based, at least in part, on at least one of:
   a minimum pixilated line measurement;
   a minimum pixilated object transition measurement; or
   a maximum pixilated noise measurement.

6. The method as recited in claim 1, wherein said at least one perceived routability constraint corresponds to at least a portion of a line or an object transition identified within said displayable image data, and wherein setting said measure of confidence for said at least one perceived routability constraint further comprises:
   associating a weight value with said at least said portion of said line or said object transition identified within said displayable image data, said weight value corresponding to the estimated likelihood that said at least one perceived routability constraint represents an actual physical obstacle to navigation.

7. The method as recited in claim 6, and further comprising:
   affecting a propagation of at least one particle within a particle filtering model based, at least in part, on said weight value associated with said at least said portion of said line or said object transition.

8. The method as recited in claim 1, wherein said at least one perceived routability constraint corresponds to at least one edge identified within a routability graph corresponding to at least a portion of said displayable image data, and wherein setting said measure of confidence for said at least one perceived routability constraint further comprises:
   associating a weight value with said at least one edge, said weight value corresponding to the estimated likelihood that said at least one perceived routability constraint represents an actual physical obstacle to navigation, wherein the actual physical obstacle is capable of affecting said trajectory of said mobile device along said at least one edge within a corresponding region of said indoor environment.

9. The method as recited in claim 8, and further comprising:
   affecting a propagation of at least one particle within a particle filtering model based, at least in part, on said weight value associated with said at least one edge.

10. The method as recited in claim 1, and further comprising:
    affecting said at least said measure of confidence based, at least in part, on subsequently received positioning data for at least one of said mobile device or one or more other mobile devices as result of movement therein within said indoor environment.

11. The method as recited in claim 1, and further comprising:
    affecting said at least said measure of confidence based, at least in part, on an age of said electronic map.

12. The method as recited in claim 1, and further comprising:
    presenting estimated positioning information to a user of said mobile device, said estimated positioning information being based, at least in part, on said trajectory of said mobile device within said indoor environment.

13. The method as recited in claim 12, wherein said estimated positioning information is based, at least in part, on said electronic map.

14. An apparatus for use in a mobile device, the apparatus comprising:
    means for receiving an electronic map for an indoor environment, wherein at least a portion of said electronic map comprises displayable image data;
    means for selecting at least one perceived routability constraint based, at least in part, on said displayable image data;
    means for setting a measure of confidence for said at least one perceived routability constraint based, at least in part, on said displayable image data, wherein the measure of confidence corresponds to an estimated likelihood that said at least one perceived routability constraint represents an actual physical obstacle to navigation;

means for estimating a trajectory of said mobile device within said indoor environment based, at least in part, on said measure of confidence; and means for presenting estimated positioning information to a user of said mobile device, said estimated positioning information being based, at least in part, on said trajectory of said mobile device within said indoor environment.

15. The apparatus as recited in claim 14, wherein at least a portion of said displayable image data represents a plurality of pixels corresponding to at least a portion of a line or an object transition, and further comprising:

means for selecting at least said plurality of pixels as said at least one perceived routability constraint based, at least in part, on one or more threshold values.

16. The apparatus as recited in claim 15, wherein at least one of said one or more threshold values is based, at least in part, on at least one of:

a minimum pixilated line measurement;
a minimum pixilated object transition measurement; or
a maximum pixilated noise measurement.

17. The apparatus as recited in claim 14, wherein said at least one perceived routability constraint corresponds to at least a portion of a line or an object transition identified within said displayable image data, and wherein the means for setting the measure of confidence for said at least one perceived routability constraint further comprises:

means for associating a weight value with said at least said portion of said line or said object transition identified within said displayable image data, said weight value corresponding to the estimated likelihood that said at least one perceived routability constraint represents an actual physical obstacle to navigation.

18. The apparatus as recited in claim 17, and further comprising:

means for affecting a propagation of at least one particle within a particle filtering model based, at least in part, on said weight value associated with said at least said portion of said line or said object transition.

19. The apparatus as recited in claim 14, wherein said at least one perceived routability constraint corresponds to at least one edge identified within a routability graph corresponding to at least a portion of said displayable image data, and wherein the means for setting said measure of confidence for said at least one perceived routability constraint further comprises:

means for associating a weight value with said at least one edge, said weight value corresponding to the estimated likelihood that said at least one perceived routability constraint represents an actual physical obstacle to navigation, wherein the actual physical obstacle is capable of affecting said trajectory of said mobile device along said at least one edge within a corresponding region of said indoor environment.

20. The apparatus as recited in claim 19, and further comprising:

means for affecting a propagation of at least one particle within a particle filtering model based, at least in part, on said weight value associated with said at least one edge.

21. The apparatus as recited in claim 14, and further comprising:

means for affecting said at least said measure of confidence based, at least in part, on subsequently received positioning data for at least one of said mobile device or one or more other mobile devices as result of movement therein within said indoor environment.

22. The apparatus as recited in claim 14, and further comprising:

means for affecting said at least said measure of confidence based, at least in part, on an age of said electronic map.

23. A mobile device comprising:
memory;
an output unit; and
one or more processing units to:
access an electronic map for an indoor environment via said memory, wherein at least a portion of said electronic map comprises displayable image data;
select at least one perceived routability constraint based, at least in part, on said displayable image data;
set a measure of confidence for said at least one perceived routability constraint based, at least in part, on said displayable image data, wherein the measure of confidence corresponds to an estimated likelihood that said at least one perceived routability constraint represents an actual physical obstacle to navigation;
estimate a trajectory of said mobile device within said indoor environment based, at least in part, on said measure of confidence; and
initiate presentation of estimated positioning information to a user of said mobile device via said output unit, said estimated positioning information being based, at least in part, on said trajectory of said mobile device within said indoor environment.

24. The mobile device as recited in claim 23, wherein at least a portion of said displayable image data represents a plurality of pixels corresponding to at least a portion of a line or an object transition, and said one or more processing units to further:

select at least said plurality of pixels as said at least one perceived routability constraint based, at least in part, on one or more threshold values.

25. The mobile device as recited in claim 24, wherein at least one of said one or more threshold values is based, at least in part, on at least one of:

a minimum pixilated line measurement;
a minimum pixilated object transition measurement; or
a maximum pixilated noise measurement.

26. The mobile device as recited in claim 23, wherein said at least one perceived routability constraint corresponds to at least a portion of a line or an object transition identified within said displayable image data, and wherein said measure of confidence for said at least one perceived routability constraint is determined, at least in part, on an association of a weight value with said at least said portion of said line or said object transition identified within said displayable image data, said weight value corresponding to the estimated likelihood that said at least one perceived routability constraint represents an actual physical obstacle to navigation.

27. The mobile device as recited in claim 26, said one or more processing units to further:

affect a propagation of at least one particle within a particle filtering model based, at least in part, on said weight value associated with said at least said portion of said line or said object transition.

28. The mobile device as recited in claim 23, wherein said at least one perceived routability constraint corresponds to at least one edge identified within a routability graph corresponding to at least a portion of said displayable image data, and wherein said measure of confidence for said at least one perceived routability constraint is determined, at least in part, on an association of a weight value with said at least one edge, said weight value corresponding to the estimated likelihood that said at least one perceived routability constraint represents an actual physical obstacle to navigation, wherein the actual physical obstacle is capable of affecting a trajectory of said mobile device along said at least one edge within a corresponding region of said indoor environment.

29. The mobile device as recited in claim 28, said one or more processing units to further:
affect a propagation of at least one particle within a particle filtering model based, at least in part, on said weight value associated with said at least one edge.

30. The mobile device as recited in claim 23, said one or more processing units to further:
affect said at least said measure of confidence based, at least in part, on subsequently received positioning data for at least one of said mobile device or one or more other mobile devices as result of movement therein within said indoor environment.

31. The mobile device as recited in claim 23, said one or more processing units to further:
affect said at least said measure of confidence based, at least in part, on an age of said electronic map.

32. An article for use in a computing device to support mobile device positioning, the article comprising:
a non-transitory computer readable medium having computer implementable instructions stored therein that are executable by one or more processing units of a computing platform of a mobile device to:
receive an electronic map for an indoor environment, wherein at least a portion of said electronic map comprises displayable image data;
select at least one perceived routability constraint based, at least in part, on said displayable image data;
set a measure of confidence for said at least one perceived routability constraint based, at least in part, on said displayable image data, wherein the measure of confidence corresponds to an estimated likelihood that said at least one perceived routability constraint represents an actual physical obstacle to navigation;
estimate a trajectory of said mobile device within said indoor environment based, at least in part, on said measure of confidence; and
initiate presentation of estimated positioning information to a user of said mobile device, said estimated positioning information being based, at least in part, on said trajectory of said mobile device within said indoor environment.

33. The article as recited in claim 32, wherein at least a portion of said displayable image data represents a plurality of pixels corresponding to at least a portion of a line or an object transition, and said computer implementable instructions are further executable by said one or more processing units to:
select at least said plurality of pixels as said at least one perceived routability constraint based, at least in part, on one or more threshold values.

34. The article as recited in claim 33, wherein at least one of said one or more threshold values is based, at least in part, on at least one of:
a minimum pixilated line measurement;
a minimum pixilated object transition measurement; or
a maximum pixilated noise measurement.

35. The article as recited in claim 32, wherein said at least one perceived routability constraint corresponds to at least a portion of a line or an object transition identified within said displayable image data, and wherein said measure of confidence for said at least one perceived routability constraint is determined, at least in part, on an association of a weight value with said at least said portion of said line or said object transition identified within said displayable image data, said weight value corresponding to the estimated likelihood that said at least one perceived routability constraint represents an actual physical obstacle to navigation.

36. The article as recited in claim 35, said computer implementable instructions are further executable by said one or more processing units to:
affect a propagation of at least one particle within a particle filtering model based, at least in part, on said weight value associated with said at least said portion of said line or said object transition.

37. The article as recited in claim 32, wherein said at least one perceived routability constraint corresponds to at least one edge identified within a routability graph corresponding to at least a portion of said displayable image data, and wherein said measure of confidence for said at least one perceived routability constraint is determined, at least in part, on an association of a weight value with said at least one edge, said weight value corresponding to the estimated likelihood that said at least one perceived routability constraint represents an actual physical obstacle to navigation, wherein the actual physical obstacle is capable of affecting a trajectory of said mobile device along said at least one edge within a corresponding region of said indoor environment.

38. The article as recited in claim 37, said computer implementable instructions are further executable by said one or more processing units to:
affect a propagation of at least one particle within a particle filtering model based, at least in part, on said weight value associated with said at least one edge.

39. The article as recited in claim 32, and said computer implementable instructions are further executable by said one or more processing units to:
affect said at least said measure of confidence based, at least in part, on subsequently received positioning data for at least one of said mobile device or one or more other mobile devices as result of movement therein within said indoor environment.

40. The article as recited in claim 32, said computer implementable instructions are further executable by said one or more processing units to:
affect said at least said measure of confidence based, at least in part, on an age of said electronic map.

* * * * *